(12) United States Patent
Murray et al.

(10) Patent No.: US 10,873,454 B2
(45) Date of Patent: Dec. 22, 2020

(54) CLOUD STORAGE ENCRYPTION WITH VARIABLE BLOCK SIZES

(71) Applicant: Zettaset, Inc., Mountain View, CA (US)

(72) Inventors: Eric A. Murray, Los Gatos, CA (US); Maksim Yankovsky, Mountain View, CA (US)

(73) Assignee: ZETTASET, INC., Los Altos, CA (US)

( * ) Notice: Subject to any disclaimer, the term of this patent is extended or adjusted under 35 U.S.C. 154(b) by 381 days.

(21) Appl. No.: 16/026,279

(22) Filed: Jul. 3, 2018

(65) Prior Publication Data

US 2019/0013936 A1    Jan. 10, 2019

Related U.S. Application Data

(63) Continuation-in-part of application No. 15/813,943, filed on Nov. 15, 2017, now Pat. No. 10,043,029, (Continued)

(51) Int. Cl.
*H04L 29/06* (2006.01)
*H04L 9/08* (2006.01)
(Continued)

(52) U.S. Cl.
CPC ............ *H04L 9/088* (2013.01); *G06F 21/602* (2013.01); *G06F 21/6218* (2013.01);
(Continued)

(58) Field of Classification Search
None
See application file for complete search history.

(56) References Cited

U.S. PATENT DOCUMENTS 6,618,789 B1    9/2003    Okaue et al.
6,792,539 B1    9/2004    Oishi et al.
(Continued)

FOREIGN PATENT DOCUMENTS

EP    2511848 A3    4/2014
WO    2013-093209 A1    6/2013

OTHER PUBLICATIONS

R. Housely, "Using AES-CCM and AES-GCM Authenticated Encryption in the Cryptographic Message Syntax (CMS)", RFC 5084, Network Working Group, Nov. 2007, p. 1-11. (Year: 2007).*
(Continued)

*Primary Examiner* — Jeffery L Williams
(74) *Attorney, Agent, or Firm* — Asif Ghias

(57) ABSTRACT

Techniques are disclosed for securing data in a cloud storage. Plaintext files are stored as secured, encrypted files in the cloud. The ciphering scheme employs per-block authenticated encryption and decryption. A unique file-key is used to encrypt each file. The file-key is wrapped by authenticated encryption in a wrapping-key that may be shared between files. A centralized security policy contains policy definitions which determine which files will share the wrapping-key. Wrapping-keys are stored in a KMIP compliant key manager which may be backed by a hardware security module (HSM). File metadata is protected by a keyed-hash message authentication code (HMAC). A policy engine along with administrative tools enforce the security policy which also remains encrypted in the system. Various embodiments support blocks of fixed as well as variable sizes read/written from/to the cloud storage.

25 Claims, 15 Drawing Sheets

Related U.S. Application Data which is a continuation-in-part of application No. 15/168,332, filed on May 31, 2016, now Pat. No. 10,298,555, which is a continuation-in-part of application No. 14/245,295, filed on Apr. 4, 2014, now Pat. No. 9,363,247.

(60) Provisional application No. 62/425,821, filed on Nov. 23, 2016.

(51) Int. Cl.
*G06F 21/62* (2013.01)
*G06F 21/60* (2013.01)
*H04L 9/06* (2006.01)

(52) U.S. Cl.
CPC ........ *G06F 21/6245* (2013.01); *H04L 9/0637* (2013.01); *H04L 9/0822* (2013.01); *H04L 63/20* (2013.01)

(56) References Cited

U.S. PATENT DOCUMENTS

| | | | |
|---|---|---|---|
| 7,117,371 | B1 | 10/2006 | Parthasarathy et al. |
| 7,319,751 | B2 | 1/2008 | Kirichenko |
| 7,392,384 | B2 | 6/2008 | Hopkins et al. |
| 7,921,284 | B1 | 4/2011 | Kinghom et al. |
| 8,037,319 | B1 | 10/2011 | Clifford |
| 8,117,464 | B1 | 2/2012 | Kogelnik |
| 8,121,294 | B2 | 2/2012 | Ciet et al. |
| 8,397,084 | B2 | 3/2013 | Ranade |
| 8,667,273 | B1 | 3/2014 | Billstrom et al. |
| 8,782,441 | B1 | 7/2014 | Osterwalder et al. |
| 8,832,466 | B1 | 9/2014 | McGregor, Jr. et al. |
| 9,268,964 | B1 | 2/2016 | Schepis et al. |
| 9,619,487 | B2 | 4/2017 | Bane et al. |
| 2002/0138726 | A1 | 9/2002 | Sames et al. |
| 2004/0091114 | A1 | 5/2004 | Carter et al. |
| 2006/0126835 | A1* | 6/2006 | Kim ............... H04L 9/0637 380/44 |
| 2006/0136721 | A1 | 6/2006 | Bruestle et al. |
| 2007/0011469 | A1 | 1/2007 | Allison et al. |
| 2007/0016771 | A1 | 1/2007 | Allison et al. |
| 2008/0263363 | A1 | 10/2008 | Jueneman et al. |
| 2009/0106549 | A1 | 4/2009 | Mohamed |
| 2009/0172265 | A1 | 7/2009 | Park et al. |
| 2009/0225981 | A1 | 9/2009 | Metzger et al. |
| 2009/0225987 | A1* | 9/2009 | Metzger ............... H04L 9/12 380/278 |
| 2009/0265772 | A1 | 10/2009 | Hitchcock et al. |
| 2009/0287837 | A1 | 11/2009 | Felsher |
| 2009/0304180 | A1 | 12/2009 | Kunigk et al. |
| 2010/0070778 | A1 | 3/2010 | Murray |
| 2010/0095115 | A1 | 4/2010 | Murray |
| 2010/0095127 | A1 | 4/2010 | Banerjee et al. |
| 2010/0095132 | A1 | 4/2010 | Murray |
| 2010/0098255 | A1 | 4/2010 | Ciet et al. |
| 2010/0138905 | A1 | 6/2010 | Kass |
| 2010/0150344 | A1 | 6/2010 | Karroumi et al. |
| 2010/0169640 | A1 | 7/2010 | Smith et al. |
| 2010/0332825 | A1 | 12/2010 | Bradley, II et al. |
| 2011/0022640 | A1 | 1/2011 | Franco et al. |
| 2011/0161370 | A1 | 6/2011 | Miyamae et al. |
| 2011/0239001 | A1 | 9/2011 | McCormack |
| 2011/0252232 | A1 | 10/2011 | DeAtley et al. |
| 2011/0252233 | A1 | 10/2011 | DeAtley et al. |
| 2011/0252234 | A1 | 10/2011 | DeAtley et al. |
| 2011/0252236 | A1 | 10/2011 | DeAtley et al. |
| 2011/0252243 | A1 | 10/2011 | Brouwer et al. |
| 2012/0042162 | A1 | 2/2012 | Anglin et al. |
| 2012/0072723 | A1* | 3/2012 | Orsini ............... G06F 21/6209 713/165 |
| 2012/0110323 | A1 | 5/2012 | Colclasure et al. |
| 2012/0134491 | A1 | 5/2012 | Liu |
| 2012/0189119 | A1 | 7/2012 | Brickell et al. |
| 2012/0254125 | A1 | 10/2012 | Bosson |
| 2012/0254136 | A1 | 10/2012 | Bosson |
| 2012/0278622 | A1 | 11/2012 | Lesavich et al. |
| 2013/0136256 | A1 | 5/2013 | Relyea et al. |
| 2013/0198522 | A1 | 8/2013 | Kohono et al. |
| 2013/0346716 | A1 | 12/2013 | Resch |
| 2014/0020111 | A1* | 1/2014 | Wang ............... G06F 21/10 726/26 |
| 2014/0032924 | A1 | 1/2014 | Durham et al. |
| 2014/0040286 | A1 | 2/2014 | Bane et al. |
| 2014/0075518 | A1 | 3/2014 | DSouza et al. |
| 2014/0089683 | A1 | 3/2014 | Miller et al. |
| 2014/0122866 | A1 | 5/2014 | Haeger et al. |
| 2014/0130119 | A1 | 5/2014 | Goldschlag et al. |
| 2014/0143541 | A1 | 5/2014 | Chang |
| 2014/0189348 | A1 | 7/2014 | El-Shimi et al. |
| 2014/0258719 | A1 | 9/2014 | Cidon et al. |
| 2014/0304512 | A1 | 10/2014 | Kotov et al. |
| 2014/0355754 | A1* | 12/2014 | Leung ............... H04L 9/065 380/28 |
| 2014/0365759 | A1 | 12/2014 | Wang et al. |
| 2015/0082399 | A1* | 3/2015 | Wu ............... G06F 21/6209 726/6 |
| 2015/0134962 | A1* | 5/2015 | Mahajan ............... H04L 63/0428 713/171 |
| 2015/0161410 | A1 | 6/2015 | Andersen et al. |
| 2015/0244522 | A1 | 8/2015 | Cheruvath et al. |
| 2015/0281189 | A1* | 10/2015 | Nayshtut ............... H04L 63/045 713/168 |
| 2015/0288664 | A1* | 10/2015 | Murray ............... H04L 63/0435 713/165 |
| 2016/0078243 | A1 | 3/2016 | Bruso et al. |
| 2016/0078244 | A1 | 3/2016 | Bruso et al. |
| 2016/0196440 | A1* | 7/2016 | O'Hare ............... G06F 21/6209 726/28 |
| 2016/0378689 | A1* | 12/2016 | O'Hare ............... H04L 9/085 713/171 |

OTHER PUBLICATIONS

Patel S., Ramzan Z., Sundaram G.S. (2004) Efficient Constructions of Variable-Input-Length Block Ciphers. In: Handschuh H., Hasan M.A. (eds) Selected Areas in Cryptography. SAC 2004. Lecture Notes in Computer Science, vol. 3357. Springer, Berlin, Heidelberg. https://doi.org/10.1007/978-3-540-30564-4_23 (Year: 2004).*

Bian, et al., The Jigsaw Secure Distributed File System, Division of Biomedical Informatics, Univ. of AK for Medical Sciences, 2009, pp. 1-24, IEEE Symposium on Computational Intelligence in Cyber Security, Journal Version, Nashville, TN, USA.

Borthakur, D., "The Hadoop Distributed File System: Architecture and Design", http://hadoop.apache.org/docs/current/hadoop-project-dist/hadoop-hdfs/HdfsDesign.html, 2014, pp. 1-14, Apache Software Foundation.

Cloudberry, "CloudBerry Lab Security Considerations", http://www.cloudberrylab.com, Oct. 16, 2017, New York, USA.

Cloudberry, "Encrypted Backup to the Cloud Storage with CloudBerry Backup", https://www.cloudberrylab.com/encrypted-backup-to-cloud-storage.aspx, Oct. 16, 2017, New York, USA.

Cloudberry, "Free Amazon S3 Explorer for Windows", https://cloudberrylab.com/explorer/amazon-s3.aspx, Oct. 12, 2017, New York, USA.

Gemalto, "SafeNet ProtectApp", http://safenet.gemalto.com, Gemalto, Gemalto, Oct. 12, 2017, Belcamp, MD, USA.

Gemalto, "SafeNet ProtectFile", http://safenet.gemalto.com, Gemalto, Oct. 16, 2017, Belcamp, MD, USA.

Gemalto, "SafeNet ProtectV", http://safenet.gemalto.com, Gemalto, Oct. 16, 2017, Belcamp, MD, USA.

Howard, et al., Scale and Performance in a Distributed File System, ACM Transactions on Computer Systems, vol. 5, No. 1, Feb. 1988, pp. 51-81, ACM New York, NY, USA.

Kher, et al., Securing Distributed Storage: Challenges, Techniques, and Systems, Proceedings of the 2005 ACM workshop on Storage security and survivability, 2005, pp. 9-25, ACM New York, NY, USA.

(56) References Cited

OTHER PUBLICATIONS

McGrew, David A. et al., "The Galois/Counter Mode of Operation (GCM)", Cisco Systems, Inc., Jan. 1, 2004, San Jose, CA, USA.

Pletka. et al.. Cryptographic Security for a High-Performance Distributed File System. Mass Storage Systems and Technologies, 2007. , pp. 227-232, MSST 2007. 24th IEEE Conference, San Diego, CA, USA.

Sandberg, R, The Sun Network Filesystem: Design, Implementation and Experience, Sun Microsystems, Inc, 1986 USENIX, California, USA.

Warner, et al., Tahoe: A Secure Distributed Filesystem, http://allmydata.org, Mar. 2008, https://tahoe-lafs.org/-warner/pycon-tahoe.html.

\* cited by examiner

```
[xxxxx@node01 ~]$ /usr/share/zts/bin/ztsfsck -b zts-zts-xxxxx-test -p words
2017-10-24 17:53:57.593 [main] INFO org.reflections.Reflections 205- Reflecti
ons took 211 ms to scan 4 urls, producing 55 keys and 118 values
2017-10-24 17:53:57.723 [main] INFO org.reflections.Reflections 205- Reflecti
ons took 15 ms to scan 2 urls, producing 20 keys and 24 values
2017-10-24 17:53:57.728 [main] INFO c.z.c.r.DynamicInstantiator 54- Searching
  for Crawler provider 'com.zettaset.crwl' package
2017-10-24 17:53:57.744 [main] INFO org.reflections.Reflections 205- Reflecti
ons took 15 ms to scan 2 urls, producing 20 keys and 24 values
2017-10-24 17:53:57.745 [main] INFO c.z.c.r.DynamicInstantiator 52- Found fol
lowing subTypes for class com.zettaset.crwl.option.IOptionsFactory: [class co
m.zettaset.crwl.option.AbstractOptionsFactory, class com.zettaset.crwl.option
.S3OptionsFactory]
2017-10-24 17:53:57.787 [main] INFO c.z.c.r.DynamicInstantiator 54- Searching
  for Crawler provider 'com.zettaset.crwl' package
2017-10-24 17:53:57.810 [main] INFO org.reflections.Reflections 205- Reflecti
ons took 21 ms to scan 2 urls, producing 20 keys and 24 values
2017-10-24 17:53:57.810 [main] INFO c.z.c.r.DynamicInstantiator 52- Found fol
lowing subTypes for class com.zettaset.crwl.strategy.IStrategyFactory: [class
  com.zettaset.crwl.strategy.S3StrategyFactory, class com.zettaset.crwl.strate
gy.AbstractStrategyFactory]
2017-10-24 17:53:57.812 [main] INFO com.zettaset.crwl.CrawlerFactory 23- Sear
ching for Crawler provider in package com.zettaset.crwl package
2017-10-24 17:53:58.554 [main] INFO c.z.c.s.S3CrawlingStrategy 52- ===========
================================
2017-10-24 17:53:58.555 [main] INFO c.z.c.s.S3CrawlingStrategy 53- Starting c
rawling on bucket zts-zts-xxxxx-test, paths: words
2017-10-24 17:53:58.555 [main] INFO c.z.c.s.S3CrawlingStrategy 54- ===========
================================
2017-10-24 17:53:58.555 [main] INFO c.z.c.s.S3CrawlingStrategy 68: list objec
ts in the bucket zts-zts-xxxxx-test, prefix words
2017-10-24 17:53:59.250 [pool-2-thread-1] INFO c.z.c.a.S3ActionExecutorImpl 4
57 Running rationalization for bucket:zts-zts-xxxxx-test, path:words
2017-10-24 17:53:59.312 [pool-2-thread-1] INFO c.z.p.PolicyServerEndpointWrap
per 44- {com.zettaset.commons.s3.rpc.messages.PolicyInfoRequest instance cont
ent: [current_version: 1.0, Operation: POLICY_INFO, message-ID: 8d5da693-f573
-464f-bbbe-fa3a39ec396f, region: us-west-2, bucket: zts-zts-xxxxx-test, key:
words]}
2017-10-24 17:53:59.408 [pool-2-thread-1] INFO c.z.c.a.S3ActionExecutorImpl 4
8- Successfully rationalized bucket:zts:zts-xxxxx-test, path:words
2017-10-24 17:53:59.408 [main] INFO c.z.crwl.GenericCrawlerRunner 155- The ch
eck was performed for following paths: words
[xxxxx@node01 ~]$
```

692

690

*Fig. 10*

CLOUD STORAGE ENCRYPTION WITH VARIABLE BLOCK SIZES

RELATED APPLICATIONS

This application is a continuation-in-part of now allowed U.S. patent application Ser. No. 15/813,943 filed on 15 Nov. 2017, which claims priority from U.S. Provisional Patent Application No. 62/425,821 filed on Nov. 23, 2016 and is also a Continuation-in-part of U.S. patent application Ser. No. 15/168,332 filed on 31 May 2016, which is a Continuation-in-part of U.S. patent application Ser. No. 14/245,295 filed on Apr. 4, 2014 and now U.S. Pat. No. 9,363,247 issued on 7 Jun. 2016. All the above numbered applications are incorporated by reference herein in their entireties.

FIELD OF THE INVENTION

This invention relates generally to the field of cyber-security and specifically to using encryption for securing data in the cloud.

BACKGROUND ART

The evolution of computing and storage resources in the cloud are posing new challenges to data security. Various cloud storage services are being offered by vendors such as Amazon Web Services (AWS, a subsidiary of Amazon.com), Google and Microsoft. AWS for instance, offers a simple storage service (S3) and an elastic block store (EBS). Unlike a Hadoop Distributed File System (HDFS), which relies on local storage, these services rely on remote storage hosted in their respective data centers.

While in a locally operated HDFS, increasing storage space simply means either adding larger hard drives to existing nodes or adding more machines to the cluster, this exercise is usually costlier and is more complicated than a cloud storage. Furthermore, unlike HDFS, users cannot run code in a pure file storage service such as S3 where file operations are limited to just various flavors of Get, Put, Copy and Delete.

In general, the requirements of securing cloud storage services which are the focus of the present disclosure, do not apply to an Apache Hadoop "stack" or architecture and associating computing paradigms. Thus, the present technology focuses on securing data in cloud storage or simply the cloud. The vendors of such cloud storage services include AWS as noted above, as well as Google Cloud and Microsoft Azure.

Let us take the example of encrypting data in an S3 cloud. Most of the options provided by S3 involve sending data to S3 over the internet in plaintext and then encrypting it there. More precisely, the data is sent over Secure Socket Layer (SSL) in encrypted form. However, once it is received at the S3 cloud it is decrypted to its plaintext form before it is encrypted with S3 encryption for storage.

S3 encryption uses a per-object data key and a wrapping-key. The administrator manually specifies the wrapping-key to use. The wrapping-keys are stored/managed in AWS's own key manager or key management system (KMS) residing in the cloud, and can have access control lists (ACL's) defined on them. AWS's cloud-based KMS allows Amazon employees access to the keys (although it takes two cooperating employees to do so).

In a similar manner, AWS supports partition-based encryption for EBS. But it only works with AWS's KMS, which again allows Amazon access to the keys. Amazon S3 also supports cloud-based Hardware security modules (HSM's), employing SafeNet Luna HSM's. Objects in S3 are stored in buckets and identified by a key. Access Control Lists (ACL's) may be defined on both the buckets and individual objects. In comparison, EBS adds permanent virtual disk partitions to AWS's elastic compute cloud (EC2) instances. In Linux, they appear as raw disk devices, the same way as a disk partition does.

S3 can use authenticated encryption of Advanced Encryption Standard (AES) in Galois/Counter Mode (GCM) mode to detect if the ciphertext has been modified. As noted above, that while the communication of plaintext data to S3 is secured from eavesdropping attacks by virtue of SSL encryption over HTTPS/HTTP-S protocol, Amazon still has access to the plaintext data. Such a design where the cloud storage providers, such as AWS/Amazon, has access to customer's/client's plaintext data, or has access to its encryption keys does not meet the security requirements of many applications and organizations.

Therefore, Amazon/AWS S3 also provides a client-side encryption class in Java that encrypts data in client's network, before it is sent to the S3 cloud. Conversely, the encrypted data is retrieved from S3 and then decrypted at the client. However, this encryption class does not possess any key management functionality. It is left up to the code developers at the client side to also provide key management functions. This usually results in manual key management by the client, which is cumbersome and encourages using only a few keys, thus compromising security.

Alternatively, the client can use an off-the-shelf KMS, but for integrating with a client-side KMS, significant code development is required by the client. This is because AWS Software Development Kit (SDK) does not have the requisite interfaces/hooks for key management. As mentioned, AWS S3 provides its own KMS for key management which the client can interface to, but this option makes the keys available to AWS.

In addition to storing data in a cloud storage such as AWS S3 and AWS EBS, data processing itself can also be moved from the client environment/network to the cloud. An example of such a compute service is the AWS EC2 instances. However, processing in the cloud does have its own security implications as follows. While these scenarios are also possible when data processing is performed on-premise at the client, access to the client network is typically much more restricted than a publicly accessible cloud.

First, the file or data keys are vulnerable being present in the cloud in the memory and not saved to the disk. Similarly, a policy engine/server running in the cloud is also vulnerable to attack. Since it receives wrapping-keys from the key manager(s) or key management interoperability protocol (KMIP) server(s), a compromise of a wrapping-key in a policy engine could get an attacker the ability to decrypt a large number of file-keys.

Additionally, the private key for the digital certificate used to authenticate a policy engine to a key manager, if stored in the cloud such as an EC2 instance, is also vulnerable. It can be attacked or (theoretically) obtained by Amazon. The key manager(s) are also vulnerable to attack in the cloud since an attacker may be able to read decrypted keys from the cloud or access the master keys stored in a cloud-based HSM to decrypt keys stored in the key database(s) of the key manager(s). As noted above, these scenarios are also theoretically possible when data processing is performed on-premise in the client's network but access to that network is typically more restricted and only available to trusted users.

There are many prior art teachings that address protecting data in a cloud storage. U.S. Patent Publication No. 2012/0278622 A1 to Lesavich discloses a method and system for electronic content storage and retrieval with Galois Fields on cloud computing networks. The electronic content is divided into many portions stored in many cloud storage objects. Storage locations for the many cloud storage objects are selected using a Galois field and the many cloud storage objects are distributed across the cloud network. When the electronic content is requested, the many portions are retrieved and transparently combined back into the original electronic content. No server network devices or target network devices can individually determine the locations of all portions of the electronic content on the cloud communications network, thereby providing layers of security and privacy for the electronic content on the cloud communications network.

U.S. Patent Publication No. 2012/0134491 A1 to Liu teaches a cloud storage security technology for encrypting the data partially. First, a size H of a random seed is calculated based on the amount of data X that is expected to be stored within some preset time, a proportion of local storage space R and the security level of data Z. Then, based on the amount Y of plaintext data each time, a data acquisition times u is calculated. Then, based on the times u, data in the size of H is acquired several times to generate a plaintext encryption bit identifier data string. Then, using the data string, more than one half of the plaintext data is selected for encryption to ciphertext. The teachings purportedly reduce the amount of encrypted data to be stored without sacrificing the degree of data security protection, thus improving cloud encryption/decryption performance.

U.S. Patent Publication No. 2014/0122866 A1 to Haeger discloses a proxy that receives a file to be stored by a cloud storage server, from a client node. The proxy and the client node are parts of a private network that does not include the cloud storage server. The proxy retrieves an encryption key associated with a user of the client node and encrypts the file using the encryption key. The proxy then transmits the encrypted file to the cloud storage server.

Besides above prior art teachings in the patent literature, other industry products that provide encryption support for S3 are Safenet ProtectApp, SafeNet ProtectV and CloudBerry Explorer Pro.

What is a absent from the prior art is a comprehensive cloud security management system having the following features:

Allow a customer to keep sole control of its data as well as sole access to its encryption keys.
Has automated key management.
Should support other key management interoperability protocol (KMIP) compliant key managers/KMS's.
Encrypt data before sending from the customer/client network to the cloud, and decrypt it after retrieving if from the cloud.
Encrypt the data so that its integrity is protected (authenticated encryption).
Have a centralized security policy defined by the administrator, that determines what data is encrypted, and specifies the granularity of the wrapping-keys.
Support pure cloud solutions (such as S3).
Support multiple cloud storage services through their corresponding application programming interfaces (API's) and require little or no modification to the existing client code.
Support files larger than 64 GB.
Encrypt files in a range of blocks or bytes to allow for efficient reads of a part of an encrypted file without decrypting the whole file.
Provide support for variable sized blocks to be encrypted/decrypted in/from the cloud storage.

The above-mentioned benefits, absent from the prior art, would benefit organizations utilizing commercial cloud data storage, and who want to encrypt their data while controlling the keys. This is because such organizations do not trust the cloud storage vendors to secure their data. They may also have regulatory requirements that require them to control their keys. They may also want to be able to switch cloud storage vendors or use multiple cloud data storage vendors, without having to implement vendor-specific encryption for each one.

OBJECTS OF THE INVENTION

In view of the shortcomings of the prior art, it is an object of the invention to provide a comprehensive cloud storage encryption system and methods.

It is further an object of the invention to allow the customer to keep sole control of the data as well as sole access to its encryption keys.

It is also an object of the invention to provide automated key management based on a centralized security policy and to support other KMIP compliant key managers/KMS's.

It is still an object of the invention to encrypt data before sending it from the client network to the cloud, and decrypt if after retrieving it from the cloud. Furthermore, the encryption should allow the integrity of the data to be protected.

It is also an object of the invention to have a security policy defined by the administrator that determines what data is encrypted, and that specifies the granularity of the wrapping-keys.

It is also an object of the invention to support pure cloud storage solutions (such as AWS S3) while requiring no modifications to the client code. The system should further support files larger than 64 GB.

It is also an object of the invention to support use cases where in addition to securing data in the cloud, data processing is also moved to the cloud.

It is also an object of the invention to allow blocks of fixed as well as variable sizes to be stored in the cloud storage in secured, encrypted manner.

Still other objects and advantages of the invention will become apparent upon reading the summary and the detailed description in conjunction with the drawing figures.

SUMMARY OF THE INVENTION

A number of objects and advantages of the invention are achieved by a computer system and methods designed for securing files in a cloud storage. The cloud storage comprises a number of storage devices hosted in a cloud network. According to the chief aspects, a plaintext file $F_p$ on a client device is secured as an encrypted, ciphertext file $F_c$ in the cloud storage. The cloud storage is network-accessible to an authenticable user $U_1$ operating the client device which is connected to a client network. The client network is separate or remote from the network where cloud storage is hosted. The client device may be any computer local to the client network or a personal device (such as a smartphone, a tablet, a laptop, etc.) belonging to user $U_1$ that is connected from a remote site into the client network via a virtual private network (VPN).

Plaintext file $F_p$ on the client device that is to be secured in the cloud contains one or more blocks $M_i$ of plaintext content/data while encrypted, ciphertext or protected file $F_c$ has corresponding one or more data blocks $*C_i$. A symmetric per-file-key FK is assigned to the plaintext file $F_p$, or equivalently to the corresponding ciphertext file $F_c$ for encryption. During block-by-block encryption of file $F_p$, which preferably employs Advanced Encryption Standard (AES) in Galois/Counter Mode (GCM) mode, the symmetric file-key FK and an initialization vector $IV_i$ corresponding to each block $M_i$ being encrypted are utilized.

Such an encryption is called authenticated encryption because it simultaneously provides confidentiality, integrity, and authenticity assurances on the data of the plaintext file $F_p$ being encrypted. Preferably, $IV_i$ is randomly generated for each block $M_i$. The AES/GCM encryption of each plaintext block $M_i$ produces a corresponding encrypted/ciphertext block $C_i$ and an authentication tag $T_i$. The converse process of authenticated decryption only decrypts an encrypted or ciphertext block $C_i$ if the integrity of the ciphertext block $C_i$ is verified, and fails otherwise.

The sequence number or block ID of plaintext block $M_i$ in file $F_p$, and corresponding initialization vector $IV_i$, encrypted block $C_i$ and tag $T_i$ are written in data block $*C_i$ of protected file $F_c$. Note the distinction between the data block $*C_i$ (with an asterisk prefix) and encrypted block $C_i$. In particular, data block $*C_i$ refers to one whole block of data in protected file $F_c$ and contains not just encrypted block $C_i$ (obtained by encrypting plaintext block $M_i$ by file-key FK and initialization vector $IV_i$) but also the sequence number of plaintext block $M_i$, initialization vector $IV_i$, tag $T_i$ as well as a version number field. The version number is used for tracking the versioning of the updates of the present system deployed for a given environment, including varying types of encryption algorithms. The attributes/fields stored in data block $*C_i$ that are in addition to ciphertext block $C_i$ are also referred to as block-metadata$_i$ (with suffix i).

There is also a symmetric wrapping-key WK, or a key encryption key (KEK), which is used to wrap file-key FK to produce a wrapped-file-key WFK. The symmetric file-key FK is unique per file, while wrapping-key WK may be configured to be shared between files of a directory or a directory-tree. This configuration or policy definition is contained in an encrypted security/configuration policy preferably managed by a policy engine and administrative tools. The encryption of FK by WK is also authenticated and performed using AES/GCM with a preferably randomly generated initialization vector $IV_{FK}$, and thus producing WFK as well as corresponding authentication tag $T_{FK}$.

Block-encryption/decryption of files $F_p/F_c$ are accomplished in a "compatibility" or shim layer provided above an application programming interface (API) layer of cloud storage. Preferably, the cloud storage is hosted in the data centers of AWS or Google or Microsoft Azure. Multiple such cloud vendors may also be used at a given time, without being "locked in" to the native encryption regime of a specific vendor. All calls from the client device to the cloud storage go through the shim, and because of the shim's compatibility function, those calls do not need to be changed.

Wrapping keys WK's are stored/managed by a key manager or key management system (KMS) securely communicating with the policy engine. The keys may be further secured in a hardware security module (HSM) under one or more master keys. The HSM may be on-premise/on-site at the client's site/location or hosted in the same cloud where the cloud storage resides or hosted in a different but network-accessible cloud. The client device and shim communicate with the policy engine using a secure connection. The secure connections are authenticated and encrypted.

Alongside the ciphertext file $F_c$, a file-metadata is also stored. File-metadata, or the metadata of the file, is stored in the external attributes of file $F_c$ in the cloud storage. The metadata contains several attributes related to the file and is cryptographically protected using a hash message authentication code (HMAC). In other words, an HMAC value stored alongside the metadata allows subsequent verification of the integrity of the metadata or to confirm that the metadata has not been tampered with. File-metadata contains a version number, the last rotation dates of FK and WK, an identification number or ID of WK or WK ID as it is stored in the key manager as well as $IV_{FK}$, $T_{FK}$ and HMAC explained above.

Evidently, each data block $*C_i$ of encrypted/ciphertext/protected file $F_c$ still corresponds to corresponding original plaintext block $M_i$ of plaintext file $F_p$ and the corresponding encrypted block $C_i$ of protected file $F_c$ and vice-versa in a 1-to-1 correspondence relationship. As mentioned, that during authenticated decryption of a data block $*C_i$, additional fields stored in block-metadata$_i$ of data block $*C$ are used to verify the integrity of ciphtertext block $C_i$ being decrypted. The authenticated decryption of block $C_i$ only succeeds if the authenticity is verified, to produce the original plaintext block $M_i$. In alternate embodiments, and using similar techniques, any encryption/decryption algorithm other than AES/GCM that performs authenticated encryption/decryption using symmetric keys, along with a suitable message authentication code (MAC) may be used.

As already stated, both the encryption and decryption processes occur in the shim layer. The shim layer is installed above the API of the cloud storage service. It intercepts calls generated from the client device of user $U_1$ and services them by interacting with the API of the cloud. Such calls constitute any variations of Get, Put, Copy and Delete operations on a specified file. Preferably, the system supports the key management interoperability protocol (KMIP) so that any off-the-shelf KMIP supporting key manager may be used. Such a system further allows for supporting cloud storage vendors, such as AWS, who provide their own key managers. In such a scenario, the KMIP key manager/server may reside in the same cloud where the cloud storage resides.

In one advantageous embodiment, the wrapping-keys are secured/encrypted by master keys that are kept protected in a physical and preferably physically hardened hardware security module (HSM). The HSM may also reside in the client network, or it may be off-site at a different or more secure location. It may even be a "soft" HSM. Alternatively, the HSM may reside in the same cloud as the cloud storage. Such is the case with AWS which supports cloud based HSM utilizing the Safenet Luna product.

There are several types of clients provided with the system. A Java client for the client device of user $U_1$ utilizes a Java class that is sub-classed from an appropriate AWS's S3 client class (such as AmazonS3Client( )). The shim layer calls this java class which implements the above-mentioned block-level encryption and decryption capabilities, for serving the Get, Put, Copy and Delete operations trapped by the shim layer. Since the shim and Java class work in conjunction, they are collectively sometimes referred to as just the client, which operates in the client device itself. Any higher-level code operating in the client device thus transparently uses this client for encrypting/decrypting files in the cloud storage.

In another useful embodiment, there is a representational state transfer (REST or RESTful) API implemented in a plugin to a web server, and utilizing the above Java class. The web server is preferably an Apache Tomcat server. In such an embodiment, the web server with the plugin is referred to as an internal REST server client, that is hosted on-premise at the client's network. This allows the encryption/decryption supporting file operations to be invoked from a REST client operating on the client device. There is also a command line interface (CLI) client that calls the above REST/RESTful server to provide the above secure file operations via a CLI.

In another advantageous embodiment, the REST/RESTful server is configured as a proxy server for the cloud storage service. In such an embodiment, the original uniform resource locators (URL's) used for accessing the cloud storage by any existing code or program on the client device, do not need to change at all. The URL's are directed to the above REST proxy server that transparently performs the encryption/decryption operations using the above-explained Java class that interacts with the cloud storage servers behind the scenes.

In the present system design, it is important that connections between the client device/shim and the key manager as well as the policy engine and HSM, be secure and mutually authenticated connections. That is because, policy engine would need to communicate file-key FK to the shim securely, and the key manager would need to communicate wrapping-key WK to the policy engine securely and the HSM would need to secure the master keys of the wrapping-keys. In the absence of a secure connection, these keys may also be sent via a key exchange key protocol.

In summary, the key benefits of the present design include:
   The encryption keys remain under the control and custody of the client/customer, and not the cloud storage vendor.
   Little to no changes are required to existing client code and programs.
   Key generation is automated and policy driven.
   Encryption/decryption of data is strong and authenticated.
   File/object metadata is also cryptographically protected from tampering/corruption.
   Support for fixed as well as variable sized blocks is provided as explained further below.

Further, the present "layered approach" to security is well suited to modern mobile environments. In fact, the computers system of the invention is well-adapted to applications where the client device is a mobile user device that may or may not be the user's permanent device. In general, the client device can thus be a mobile phone, a mobile computer, a tablet computer and any one of a large and growing number of thin client devices that include sensor-based computing units of the internet of things (IOT).

In a highly advantageous set of embodiments, in addition to fixed sized blocks, the above design is extended to support variable sized blocks to be encrypted/decrypted in the cloud storage. The motivation for this arises at least because many cloud storage clients send data in multiple chunks of varying size or append data in varying size chunks to existing files in the cloud storage. This may occur because of a multipart file upload operation in AWS S3 performed by client such as Boto, or it may just be the requirement of a given implementation that not all blocks read/written (Get/Put) to the encrypted cloud storage be of the same size.

In the present embodiments also, plaintext file $F_p$ on the client device that is to be secured in the cloud storage contains one or more blocks $M_i$ of plaintext content/data while encrypted, ciphertext or protected file $F_c$ has corresponding one or more data blocks $*C_i$. However, plaintext blocks $M_i$ may be of variable sizes as opposed to a fixed size. Thus, for each variable sized plaintext block $M_i$ the corresponding ciphertext block $C_i$ contained in respective data block $*C_i$ is also of a variable size.

In order to support variable sized blocks $M_i/C_i$, three additional fields/attributes in file-metadata are provided. These are default block size (DBS), block table (BT) and block lookaside table (BLT). DBS is the default size for the blocks specific to a given file $F_c$ stored in the cloud storage. During a Put/write operation for the file, if the request is to write a block of size other than DBS (or alternatively stated, if the request is for a number of bytes to be written not equal to DBS), then an entry for the physical offset where the block is being written in the cloud storage as well as the length of the block is made in BT. Since most cloud storage services have a limitation on the size of file-metadata, once BT reaches capacity, it is also Put to the cloud storage and an entry of its physical offset and size in made in the BLT. As a result, an empty BT becomes available again.

Thus, the present embodiments support two levels of indirection to support files of arbitrarily large variable sized blocks stored in a secured, encrypted manner in the cloud storage. The variable sized blocks $M_i$ as well as BT's are written to the cloud storage using authenticated encryption of the earlier embodiments. During a Get/read operation, a lookup logic inspects BT and BLT (if present) to map the virtual offset and the number of bytes requested in the read request, to physical offsets/bytes in the cloud storage.

The lookup logic may be implemented in the shim or in an adjunct code. The variable sized ciphertext blocks $C_i$ contained in respective data blocks $*C_i$ are read using authenticated decryption of the earlier embodiments. If the lookup logic suggests that the requested Get/read may be in a BT stored in the cloud storage, it is also read using authenticated decryption.

In the present embodiments also, HMAC in file-metadata is computed on all other attributes of file-metadata, including the additional fields of BDS, BT and BLT (but not including HMAC) and thus cryptographically ensures the integrity of file-metadata. The present embodiments supporting variable sizes can be used to read/write an entire file or a subset of it. All other relevant teachings and extensions of the prior embodiments also apply to the present embodiments.

The present invention, including the preferred embodiment, will now be described in detail in the below detailed description with reference to the attached drawing figures.

BRIEF DESCRIPTION OF THE DRAWING FIGURES

FIG. 10 is a screenshot of the output from the crawler tool of the present technology.

Figure 11:
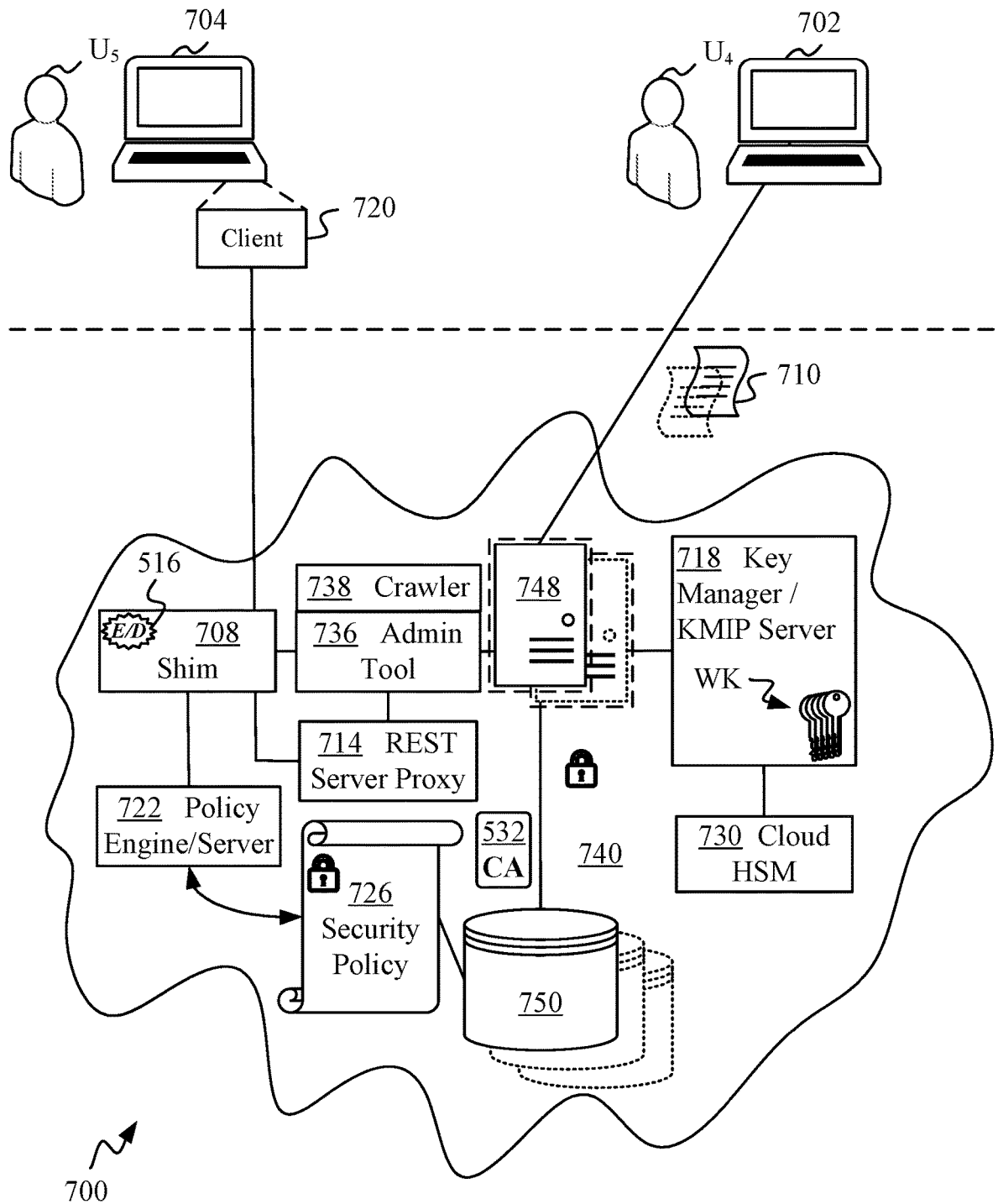

FIG. 11 highlights the flexibility of the present design showing an embodiment where data processing is also performed in the cloud.

Figure 2:
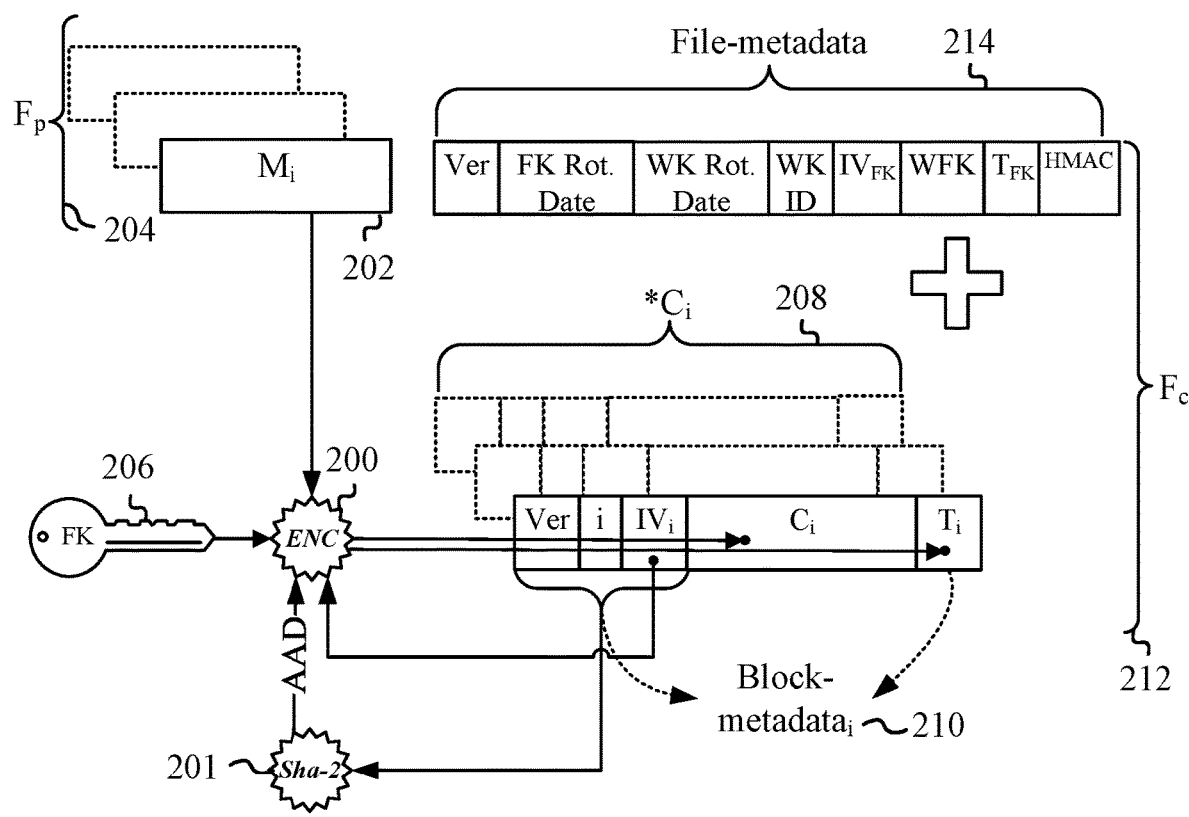
FIG. 2 illustrates the Advanced Encryption Standard (AES) in Galois/Counter Mode (GCM) mode of block-level authenticated encryption as implemented by the present design.
Figure 12:
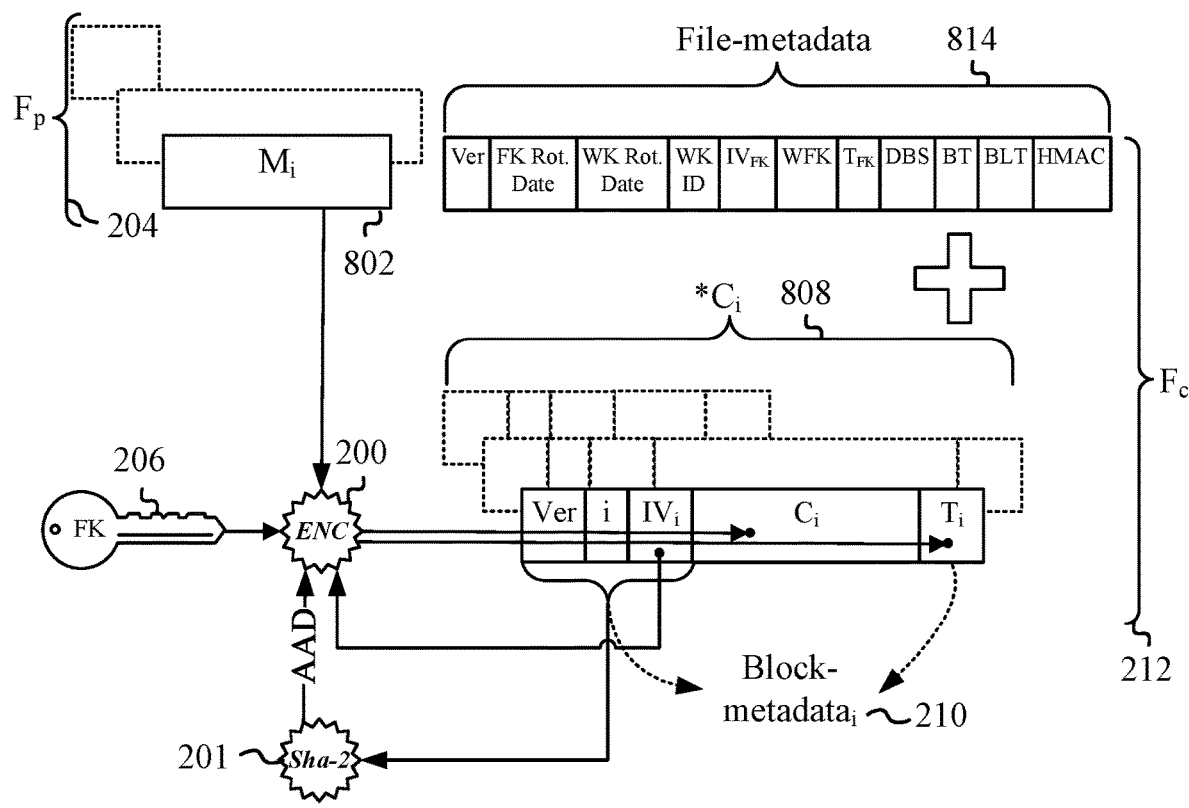

FIG. 12 is a variation of FIG. 2 showing plaintext blocks of variable sizes encrypted according to the authenticated encryption of the present design.

Figure 3:
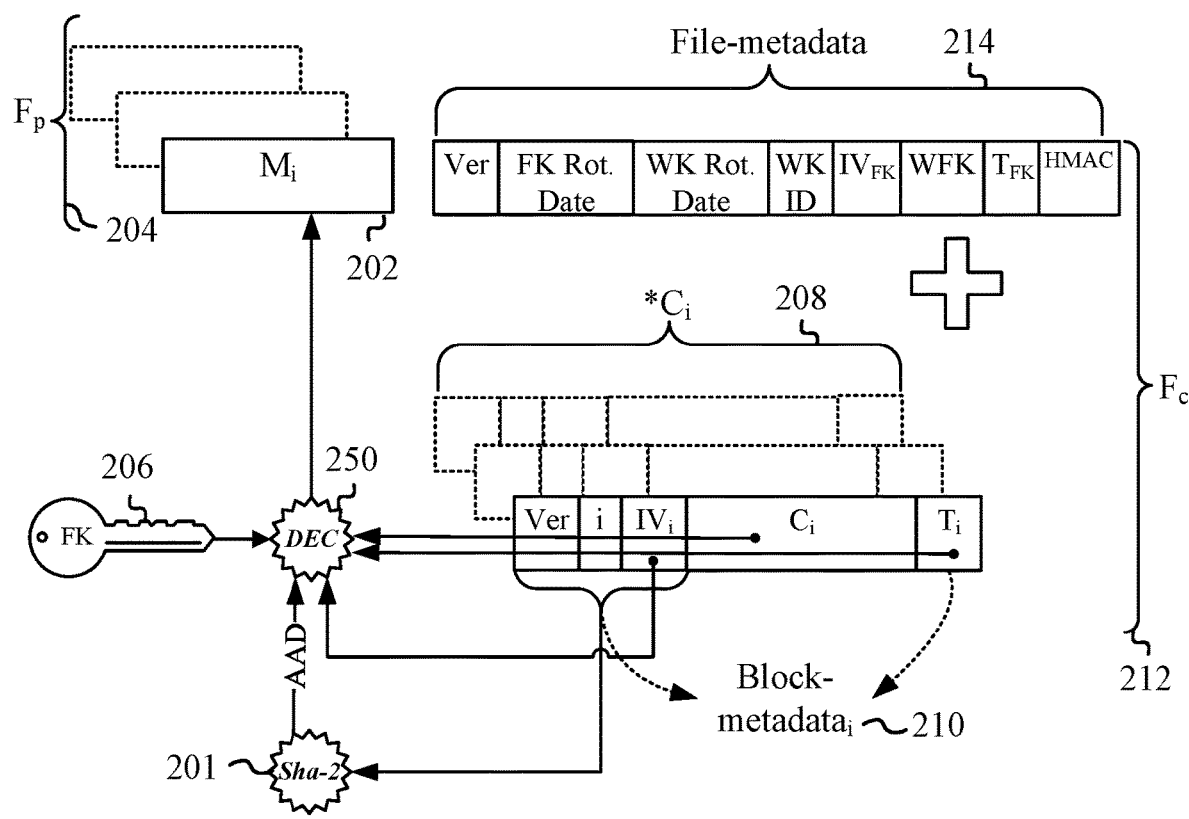
FIG. 3 illustrates the Advanced Encryption Standard (AES) in Galois/Counter Mode (GCM) mode of block-level authenticated decryption as implemented by the present design.
Figure 13:
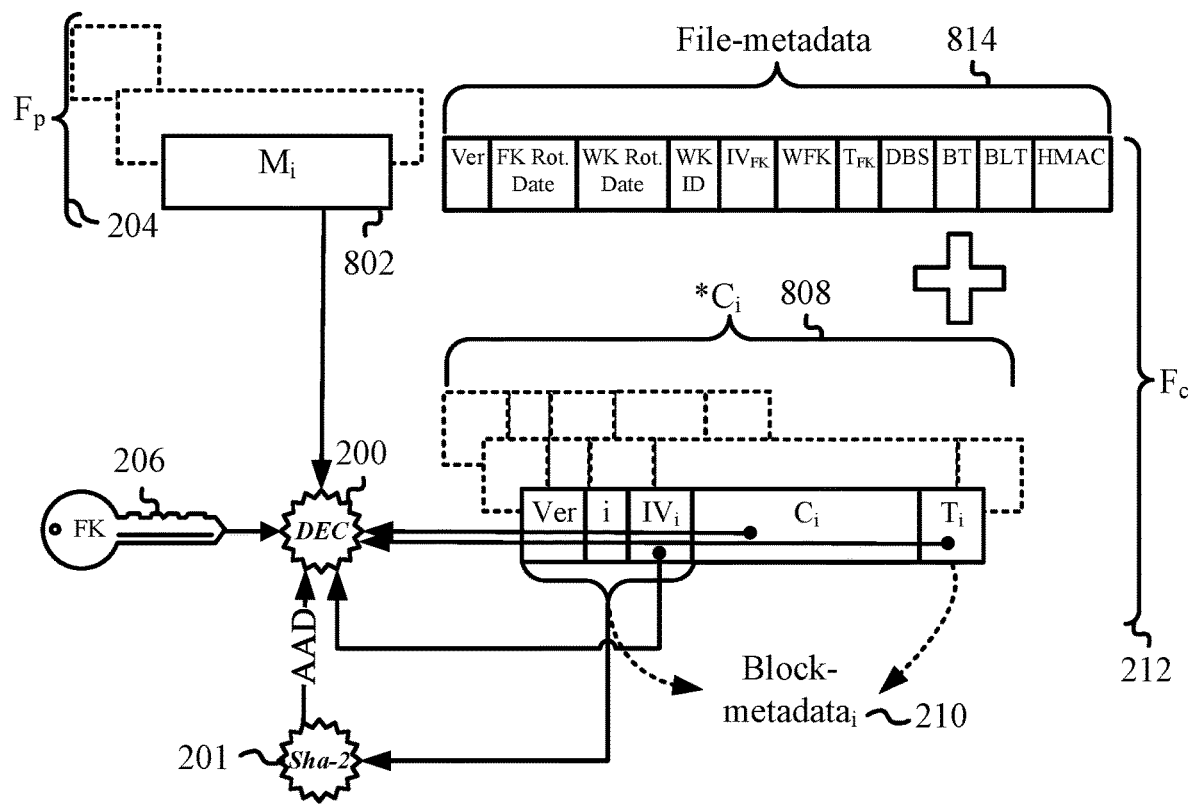

FIG. 13 is a variation of FIG. 3 showing ciphertext blocks of variable sizes decrypted according to the authenticated decryption of the present design.

Figure 4:
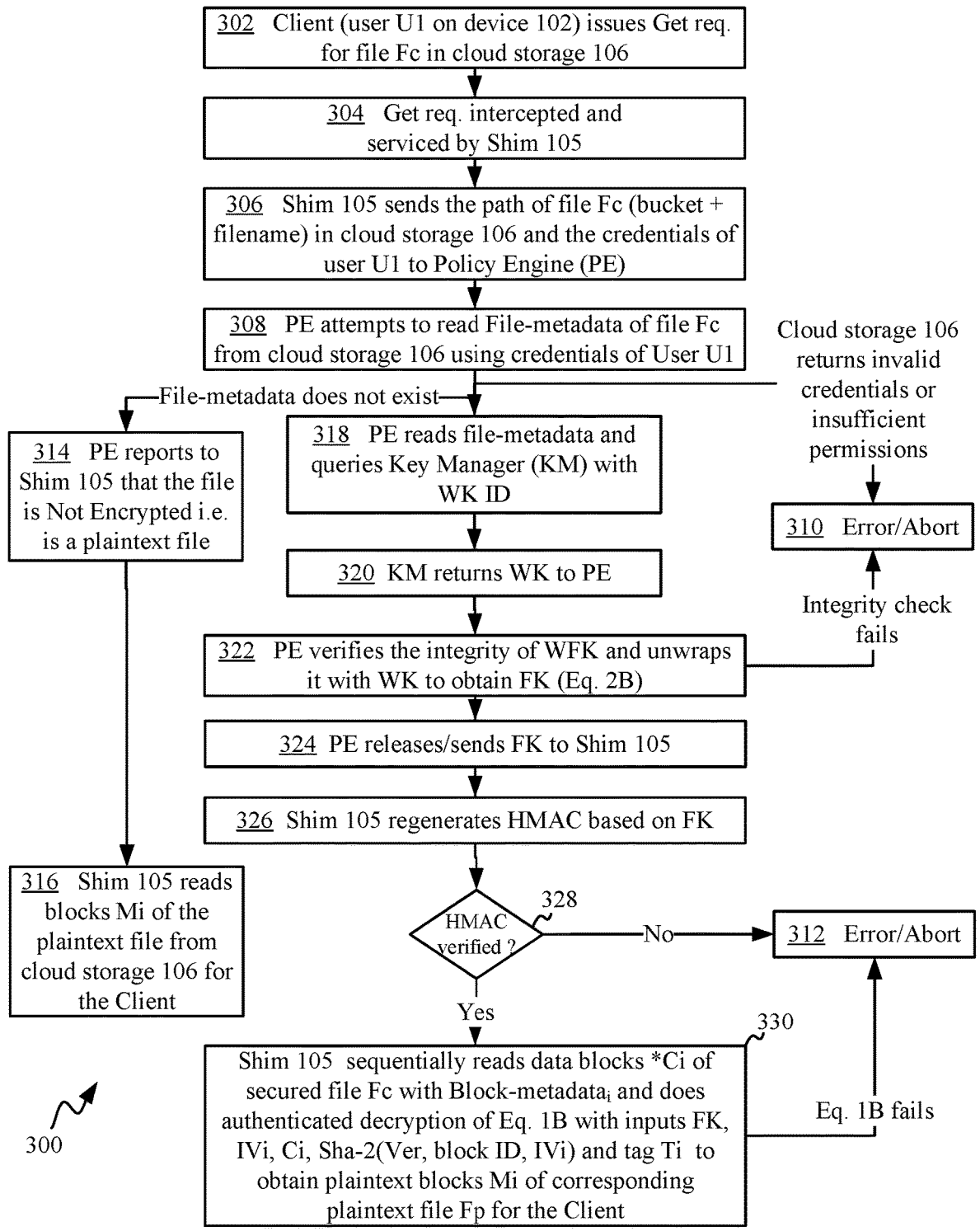
FIG. 4 is a flow diagram of the operational steps required to carry out a Get operation by the client of the instant technology.
Figure 14:
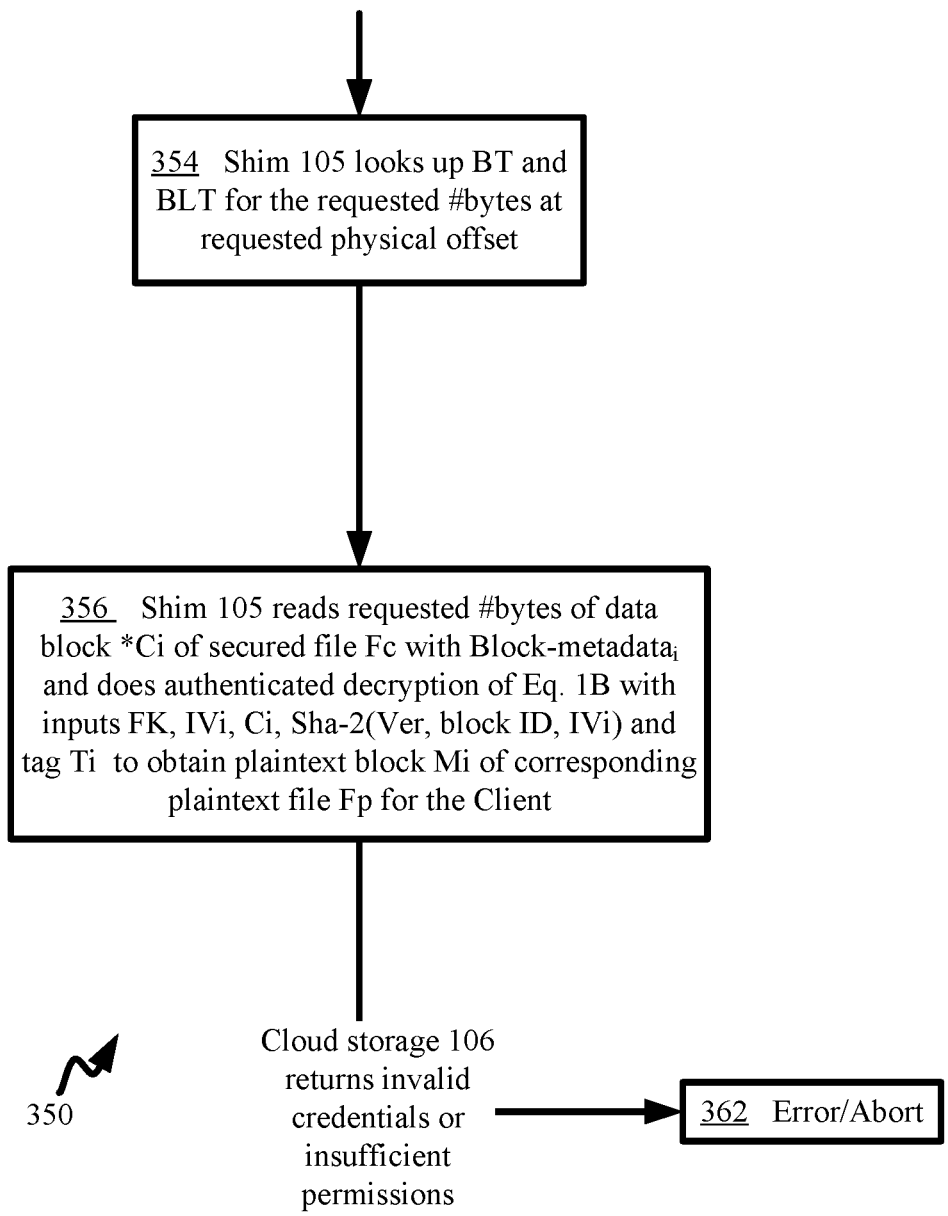

FIG. 14 is an extension to the flow diagram of FIG. 4 showing the operational steps required for the Get operation in order to support blocks of variable sizes.

Figure 5:
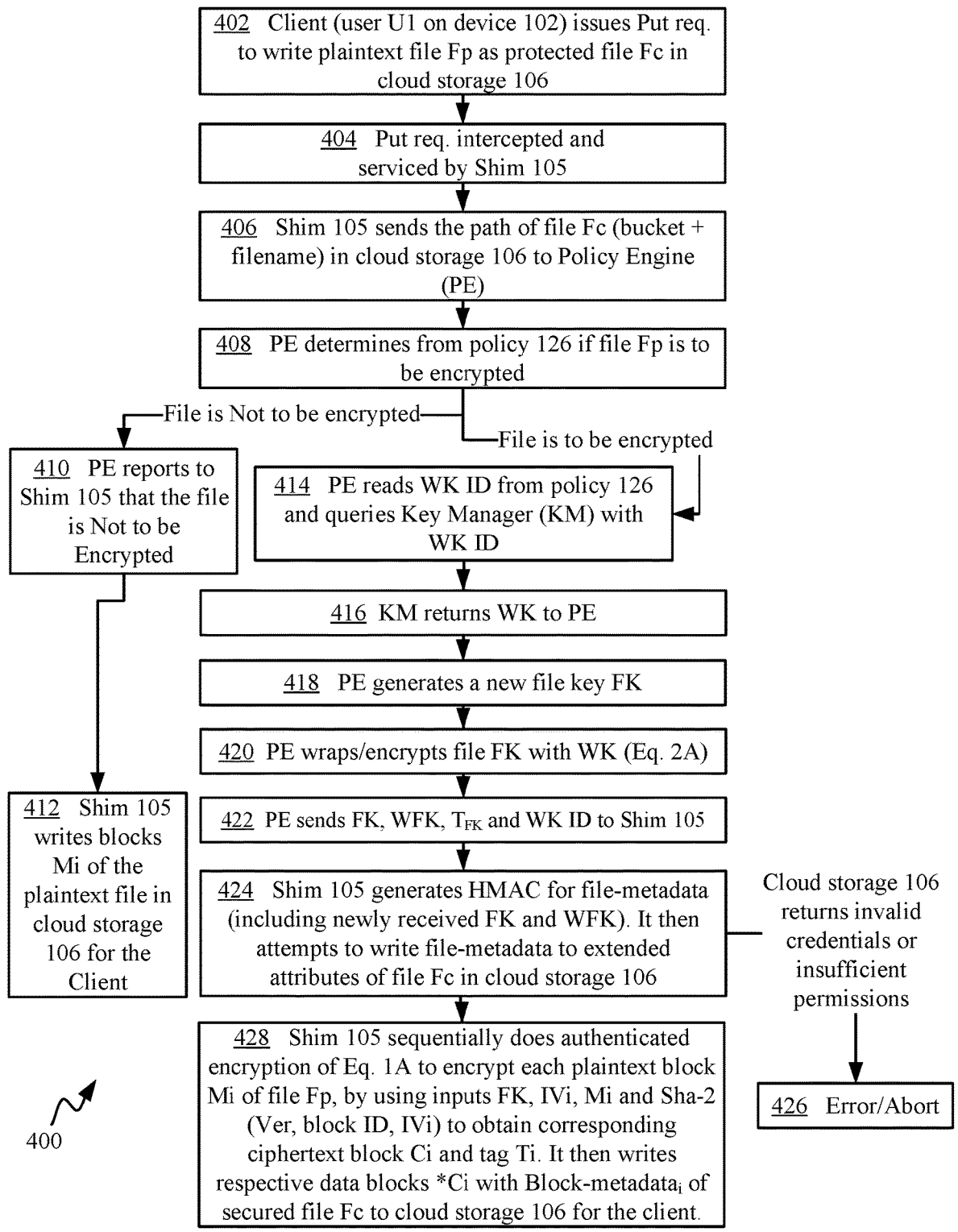
FIG. 5 is a flow diagram of the operational steps required to carry out a Put operation by the client of the instant technology.
Figure 15:
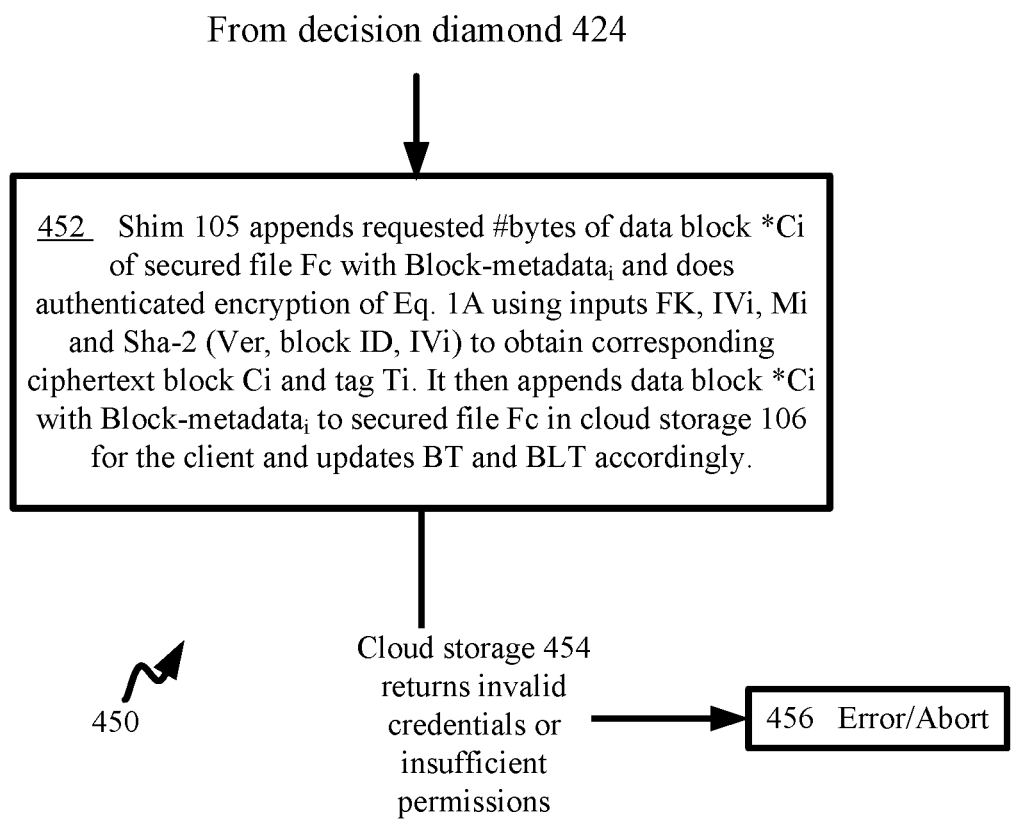

FIG. 15 is an extension to the flow diagram of FIG. 5 showing the operational steps required for the Put operation in order to support blocks of variable sizes.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
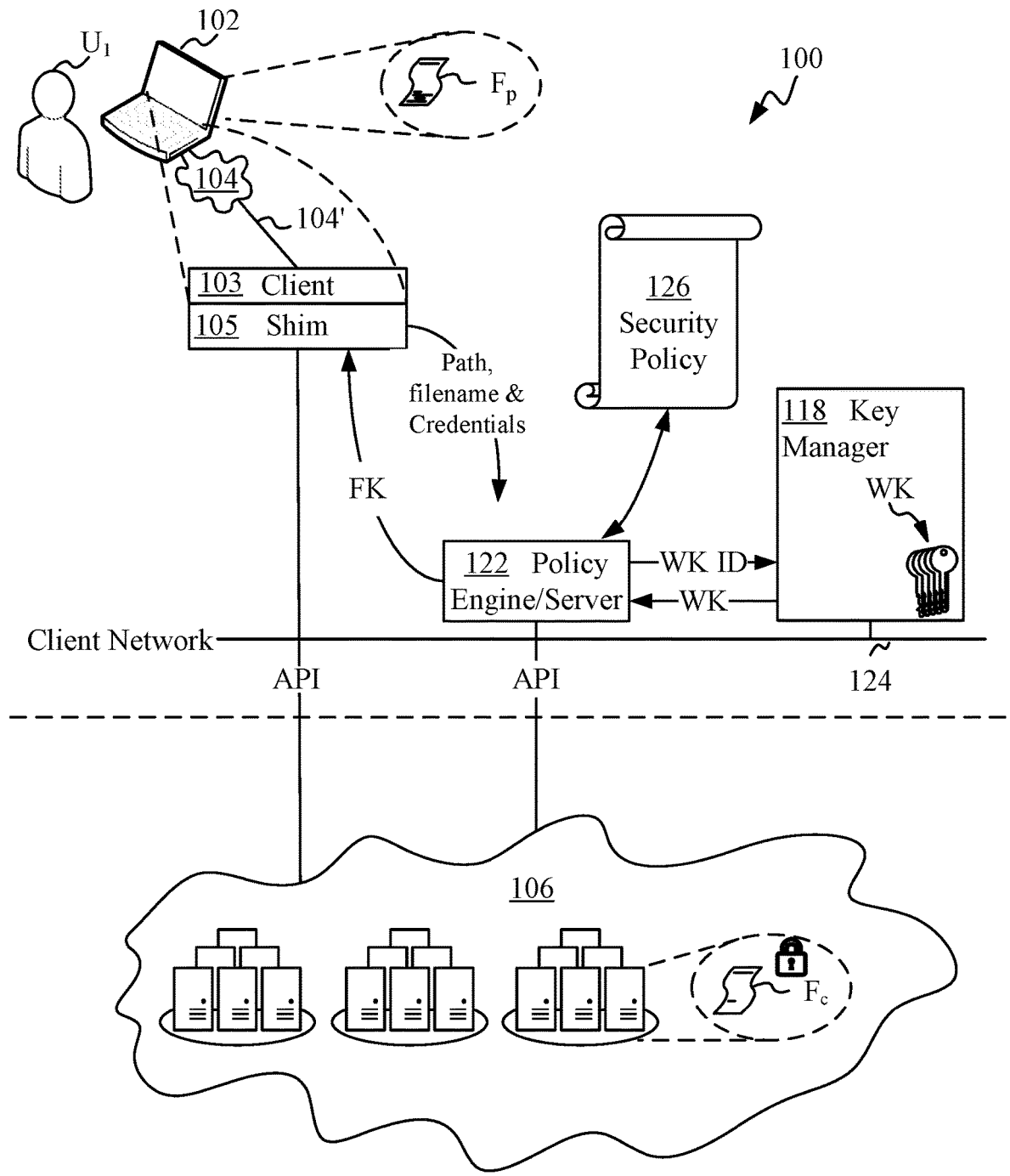
FIG. 1 is a functional overview and architecture of a cloud storage encryption system according to the invention.

The present invention will be best understood by first reviewing the cloud storage encryption system according to the teachings of the current invention as illustrated in FIG. 1. This drawing shows the main aspects of the technology having a computer system 100 with an authenticable user $U_1$, working with a client device 102. Client device 102 is one of several systems and devices connected to or a part of a client network 124 which is presumably behind a client firewall (not shown). However, client device 102 can also be a device external to client network 124 but connected to it via a virtual private network or VPN (not shown). Such a device is also sometimes referred to as an untrusted device under a semi-trusted threat model secured by the present design.

In one embodiment, client device 102 is a mobile computer, and more specifically still a laptop computer. In general, however, client device 102 can be any type of device capable of making a network connection and performing a useful computation. In many cases, client device 102 is a personal device such as a mobile phone, a mobile computer, a tablet computer, a desktop computer or any thin client device, including devices ranging from electronic watches to sensors with minimal processing capabilities. The latter are sometimes referred to as networked devices making up the internet of things (IOT) by those skilled in the art.

In the embodiment shown in FIG. 1, authenticable user $U_1$ of system 100 uses a laptop computer 102 that is either a part of client network 124 (inside its firewall) or connected to it via a VPN as discussed above. FIG. 1 also shows a network connection 104 over any suitable medium 104' using which device 102 makes its network connection. Connection 104 can thus deploy any type of wireless or wired medium 104'. Further, client network 124 is also connected to an external network such as the internet which in turn can connect to a cloud storage or network 106 as shown.

The above-mentioned external network may also include any other wide area network (WAN), a metropolitan area network (MAN) or a local area network (LAN) while its connections can be supported by any communications infrastructure including wired, optical and wireless. In any case, user $U_1$ with device 102 of client network 124 to which other modules and systems of the present design are also connected, has network-based access to cloud storage 106.

Cloud storage network 106 can be geographically collocated or spread out over several physical locations. Cloud storages of particular interest are the ones offered by several cloud storage vendors such Amazon AWS, Google and Microsoft Azure. According to the instant techniques, multiple such cloud vendors may also be used at a given time, without being "locked in" to the native encryption regime of a specific vendor. For ease of explanation, the below exemplary embodiments may typically refer to a single cloud storage environment, however the teachings will be understood to apply to multi-vendor embodiments also.

Cloud storage 106 may be hosted at one or many data centers comprising any number of machines and storage devices as will be appreciated by skilled artisans. The detailed implementation of cloud storage 106 which is essentially a network of virtual/logical/physical storage devices accessible over a network such as the internet will not be delved into in this specification, and are well known and practiced by respective vendors.

According to the main aspects, a plaintext file $F_p$ being worked on by user $U_1$ on client device 102 is secured as an encrypted, ciphertext or simply stated, a protected file $F_c$ in cloud storage 106. To emphasize this point, file $F_c$ is shown with a lock symbol in FIG. 1. Plaintext file $F_p$ that is to be secured contains one or more blocks $M_i$ of plaintext content/data, while encrypted, ciphertext or protected file $F_c$ has corresponding one or more data blocks $*C_i$. To visualize this better, let us turn our attention to FIG. 2 which depicts the ciphering or encryption process according to the instant principles.

FIG. 2 depicts that plaintext blocks $M_i$ belonging to a file $F_p$ being worked on by user $U_1$ of FIG. 1 get encrypted block-by-block according to the scheme described herein. Specifically, each block $M_i$ designated by reference numeral 202 of plaintext file $F_p$ designated by reference numeral 204 is encrypted by applying an encryption process designated by reference numeral 200. Note that file $F_p$ 204 is a collection of plaintext blocks $M_i$ 202 of which only one such block is marked by reference numeral 202 to avoid clutter. Encryption or ciphering process 200 uses symmetric file-key FK 206 to encrypt each plaintext block $M_i$, thus producing a corresponding encrypted, ciphertext block $C_i$ and an authentication tag $T_i$. Symmetric encryption has the advantage that it is more efficient at processing large amounts of encryptions and is computationally less intensive than encryption with asymmetric keys. File-key FK 206 is unique per plaintext file $F_p$ being secured as an encrypted, ciphertext or protected file $F_c$ in cloud storage 106 (see FIG. 1).

Preferably, file is encrypted block-by-block using the Advanced Encryption Standard (AES) in Galois/Counter Mode (GCM) mode of encryption. The advantages of such a GCM mode of symmetric key cryptographic ciphers include high efficiency and performance. Furthermore, AES/GCM provides authenticated encryption/decryption as will be explained further below. The encryption process is expressly visualized in FIG. 2 for the intermediate i-th block $M_i$. The application of encryption to block $M_i$ with file-key FK 206 is indicated by ENC marked by reference numeral 200. This authenticated encryption operation can be conveniently summarized as:

$$ENC(FK, IV_i, M_i, AAD) = C_i \text{ and } T_i, \quad \text{Eq. 1A}$$

where $T_i$ is an authentication tag produced by the encryption step ENC that is later used to verify the integrity of the ciphertext block $C_i$ during authenticated decryption. Here AAD stands for additional authenticated data, and is obtained by preferably performing a secure hash algorithm 2 (Sha-2) function, as shown by reference numeral 201, on fields Version/Ver, Block ID/sequence no, and per-block initialization vector $IV_i$. These fields will be explained in detail further below. This process and Eq. 1A are reminiscent of the authenticated encryption (AE) or authenticated encryption with associated data (AEAD) operation afforded by GCM. Such an encryption simultaneously provides confidentiality, integrity, and authenticity assurances on the data being encrypted.

The converse process of decryption is illustrated in FIG. 3, which contains many of the elements and their reference numerals from FIG. 2. Decryption operation is indicated by DEC marked by reference numeral 250 and since file-key FK 206 is symmetric, it is performed by inverting the order of operation and applying the authentication tag $T_i$ as follows:

$$DEC(FK, IV_i, C_i, AAD, T_i) = M_i \text{ if the inputs are authentic, FAIL otherwise.} \quad \text{Eq. 1B}$$

Again, the above process and Eq. 1B is reminiscent of the authenticated decryption operation afforded by GCM. Referring back briefly to FIG. 1, the encryption and decryption processes ENC and DEC are preferably performed in a shim layer or simply shim 105. A client application or simply a client 103 is also shown in FIG. 1. It interfaces with shim 105 on behalf of user $U_1$ to perform the tasks of encrypting or securing file $F_p$ in cloud storage 106 and decrypting it for use as needed. We may simply refer to client application 103 as simply the client, which works in conjunction with shim 105 on behalf of user $U_1$. Both client 103 and shim 105 execute on device 102 which may be internal or external to client network 124 as explained above.

As shown in FIG. 2-3, encrypted, ciphertext file $F_c$ designated by reference numeral 212 that is obtained as a result of the application of block-by-block encryption step of Eq. 1A above, consists of a number of corresponding data blocks $*C_i$ designated by reference numeral 208 plus a file-metadata 214 to be explained further below. A data block $*C_i$ of encrypted, ciphertext or protected file $F_c$ residing in cloud storage 106 (see FIG. 1), consists of a number of fields or data elements. These fields include the encrypted ciphertext block $C_i$ obtained from Eq. 1A above.

Fields or attributes in data block $*C_i$ that are additional to ciphertext block $C_i$ constitute the per-block metadata or block-metadata$_i$ (with the suffix i) according to the design. In one exemplary implementation, a data block $*C_i$ is stored as a datablock { } class, structure or attribute consisting of several attributes or fields as provided by the following code, and as shown in FIG. 2-3:

```
datablock {
    zts_int version
    zts_int block_number
    zts_vector iv
    zts_vector encryptedData
    zts_vector tag
}
```

These attributes are explained below:
1. Version number or version field. This attribute or field is used for tracking the version number of any updates being deployed for a given implementation of the present design. Such updates may apply varying encryption algorithms of various bit sizes for Eq. 1A and Eq. 1B above. Such updates may also include authenticated encryption/decryption algorithms other than GCM and any successor algorithm(s) to AES, as well as other suitable algorithms.
2. Block number/ID field i that uniquely identifies plaintext block $M_i$ in plaintext file $F_p$. This field may simply be the block ID or sequence number of block $M_i$ in the host file system in which file $F_p$ resides in client network 124 (see FIG. 1). Alternately, it may be another sequence number uniquely associated with block $M_i$. The inclusion of this attribute in block-metadata$_i$ is important to prevent block deletion or swapping attacks in which a file is corrupted by the deletion of one or more of its blocks, or the file is corrupted by the swapping of a block by another. As explained further below, a sequential block number/ID field exposes such an attack.
3. Initialization vector $IV_i$. While each file is encrypted using a unique per-file file-key FK, additional measures are taken to further ensure the security strength of the system. Specifically, a per-block initialization vector ($IV_i$) for file-key FK is varied for each block $M_i$ of file $F_p$. More precisely, and as apparent from Eq. 1A above, as each plaintext block $M_i$ of file $F_p$ is encrypted, a corresponding initialization vector ($IV_i$) for file-key FK is also changed. $IV_i$ is preferably randomly generated for each block and is the same length as the block size of the cipher (for example, 256 bits), or alternatively it can be based on the block ID or sequence number i of plaintext block $M_i$ being encrypted. Such a scheme ensures that encryption regime of Eq. 1A above using FK is constantly evolving as file $F_p$ is encrypted, block-by-block.
4. Ciphertext block $C_i$ as explained above, and
5. Authentication tag $T_i$ obtained as a result of applying Eq. 1A above.

The application of Sha-2 to version, block ID and $IV_i$ to obtain a hash for applying as AAD to authenticated encryption of Eq. 1A, cryptographically protects these fields from modification. Explained further, though these fields are authenticated and not encrypted, this process cryptographically ties these fields to the data in blocks $M_i$ being encrypted. Performing authenticated decryption of Eq. 1B then verifies the integrity of these values, and checks their tie to the data. As shown, Eq. 1B returns an error if any integrity check on its input values fails.

As already noted above, the fields or data elements additional to ciphertext block $C_i$ in data block $*C_i$ constitute the per-block metadata referred to as block-metadata$_i$ of the instant design. As shown in FIG. 2-3, this per-block metadata or block-metadata$_i$ is stored in-line with ciphertext block $C_i$ and is indicated by reference numeral 210. Preferably, the above in-line encoding uses type, length, value (TLV) encoding.

Note that TLV encoding requires that the length of the data field be known before writing it. This is easily achieved since block-metadata$_i$ explained above is in a memory buffer prior to the encryption operation of Eq. 1A. From this buffer, the length of the fields/attributes of block-metadata$_i$ can be easily computed. Thus, the size of each block $*C_i$ is known by the shim at the time of its writing. As will be apparent, that thusly the size of encrypted file $F_c$ will be larger than the corresponding plaintext file $F_p$.

According to the instant design, in addition to the per-block metadata block-metadata$_i$ 210 in FIG. 2-3, there is also a file metadata or file-metadata designated by reference numeral 214 that is stored in protected file $F_c$ 212. Preferably, file-metadata 214 is stored in the extended or external attributes of file $F_c$. Such external attributes may be implemented as user-defined attributes that are appended to ciphertext, encrypted file $F_c$. As indicated in FIG. 2-3 file-metadata 214 consists of several attributes, data elements or fields. We refer to file-metadata as an attribute itself of file $F_c$, although it is composed of several other attributes. In one exemplary implementation, file-metadata is defined in a class or attribute or structure named ZtsData { } containing several attributes and implemented by the following code.

---

ZtsData {
    zts_int version
    zts_date dataKeyRotationDate
    zts_date WrappingKeyRotationDate
    zts_vector WrappingKeyId
    zts_vector iv
    zts_vector encryptedKey
    zts_vector encryptedKeyTag
    zts_vector signature
}

---

These attributes are explained below:
1. Version or version number. Analogous to the version field in block-metadata$_i$, this attribute or field is used for tracking the version number of any updates being deployed for a given implementation of the present design. Such updates may include varying encryption algorithms of various bit sizes for Eq. 2A and Eq. 2B above. Such updates may also include authenticated encryption/decryption algorithms other than GCM and any successor algorithm(s) to AES, as well as other suitable algorithms.
2. Last rotation date of file-key FK of file $F_c$. This field is updated by the administrative tools of the present design to be explained further below.
3. Last rotation date of wrapping-key WK. This field is updated by the administrative tools of the present design to be explained further below.
4. An identification number ID of wrapping-key WK, or WK ID.
5. An initialization vector $IV_{FK}$ that is used for authenticated encryption of file-key FK. It is regenerated, preferably randomly, every time that a file-key FK is changed or is re-encrypted/re-wrapped by the wrapping-key WK.
6. Wrapped-file-key WFK that is obtained by the authenticated encryption per Eq. 2A below of file-key FK by wrapping-key WK.
7. Authentication tag $T_{FK}$, which is generated by authenticated encryption of file-key FK per Eq. 2A below, and is used later for verifying the integrity of WFK during authenticated decryption of Eq. 2B.
8. A hash message authentication code (HMAC) or signature calculated/computed over the above fields and employing as its secret key a key derived from file-key FK. Any cryptographic hash function, such as SHA-2 or SHA-3, may be used in the calculation of the HMAC.

Besides the various attributes above, another useful purpose that file-metadata implicitly serves in the present design, is identifying that a file is encrypted by the present scheme. More specifically, if file-metadata exists, the file is encrypted otherwise not.

As noted above, file-key FK is wrapped or encrypted using a symmetric wrapping-key WK to produce wrapped-file-key WFK. This encryption is again an authenticated encryption preferably utilizing AES/GCM. For this purpose, Eq. 1A above is adapted as follows:

$$\text{ENC}(WK, IV_{FK}, FK, AAD) = WFK \text{ and } T_{FK}. \quad \text{Eq. 2A}$$

Similarly, authenticated decryption of WFK adapts Eq. 1B above as follows:

$$\text{DEC}(WK, IV_{FK}, WFK, AAD, T_{FK}) = FK \text{ if the inputs are authentic, FAIL otherwise.} \quad \text{Eq. 2B}$$

The AAD input above may contain an appropriate value as may be chosen for a given implementation. In an advantageous embodiment, it is simply left blank.

Referring to FIG. 1, the block-by-block encryption and decryption of Eq. 1A and 1B respectively above, are preferably accomplished in a "compatibility" or shim layer 105. Shim 105 is configured above an API layer of cloud storage 106. Preferably, the cloud storage is hosted in the data centers of AWS or Google or Microsoft Azure. All client calls to the cloud storage go through the shim, and because of the shim's compatibility function, those calls do not need to be changed. Thus, shim 105 is adapted to interface with the particular cloud storage 106 being interfaced to using the respective API's.

In accordance with the invention and as noted earlier, a symmetric per-file-key FK is assigned to the plaintext file $F_p$, or equivalently to the corresponding ciphertext file $F_c$. A symmetric wrapping-key WK is used to wrap file-key FK to produce a wrapped-file-key WFK. Symmetric file-key FK is unique per file, while wrapping-key WK may be configured to be shared between files of a directory or a directory-tree. As such, wrapping-key WK is a key encryption key (KEK) known in the art. The above configuration is contained in a security/configuration policy 126 preferably managed by a policy engine or server 122. As shown by the lock symbol, policy file 126 is itself encrypted or signed. The signing of security policy 126 will be discussed in much more detail further below.

Policy engine 122 governs as to which files in cloud storage 106 are to be encrypted. It houses this information in security or configuration policy 126. The configuration/security policy further contains configuration information that determines whether a wrapping-key WK applies to a single file, or to all the files in its directory, or all the files in a directory-tree or a region. Because of the isolation between user $U_1$ and his/her access to cloud storage 106 via shim 105 and the wrapping-keys WK, it is possible in the present design to share a wrapping WK amongst several files, directories or directory-trees regions without compromising the strength of its security. This will become apparent from the detailed operation of the system taught below.

Policy Definitions

A centralized security policy of the present design, such as policy 126 of FIG. 1 contains on or more policy definitions or entries. Each policy definition is specified for a directory-tree or region, a bucket or directory and a file. The usage of the term bucket here is reminiscent of AWS S3 where objects or files are stored in buckets. More generally though, a directory-tree or a region is the highest level in the file hierarchy (with the lowest level of granularity), a bucket or directory is the intermediate level, and a file/filename is the lowest level in the file hierarchy (with the highest level of granularity).

Collectively, the above fields are sometimes referred to as a "path" of the file, which unfortunately also at times refers to just the filename as will be recognized by those skilled in the art. In this disclosure, the applicability of the term path when used, will be made explicit or otherwise be apparent from the context. The present design also provides regular expressions styled file matching or "globbing" capabilities. Specifically, an asterisk "*" in a policy definition may refer to any number of any characters while a question mark "?" may refer to any single character.

A policy definition specifies whether a wrapping-key WK is shared amongst all files that match the definition based on the above matching functionality. Such a policy definition is referred to as a Single Key policy definition. Alternatively, a policy definition may specify that individual files matching a policy definition all get individual or their own unique wrapping-keys WK. Such a policy definition is referred to an Individual Key policy definition. Thus, the encryption granularity of wrapping-keys WK may be specified down to the individual files where the file-key FK for each file is individually wrapped/encrypted in its own wrapping-key WK. In an exemplary implementation, if a filename matches more than one policy definitions, then the policy definition with the longest matching path is applied to the file.

The Key ID of a wrapping-key WK or WK ID for Single Key policy definitions, resides in security/configuration policy 126 itself. A centralized lookup of such a shared Key ID of a Single Key policy definition is required because otherwise, there will be no way of ensuring the consistency of the same wrapping-key WK across multiple files, or a bucket/directory, or a region or directory-tree. In comparison to the above Single Key policy definition, a centralized lookup of WK ID for Individual Key policy definitions is not required, because WK ID of an individual protected file $F_c$ in cloud storage 106 of FIG. 1 is stored in its metadata file-metadata 214 (see FIG. 2-3 and associated explanation).

Example Policy Definitions

Paths defined in policy definitions follow the template */*/* to map to region/bucket/file hierarchy of AWS S3 or more generally to directory-tree/directory/file. Some exemplary paths in policy definitions contained in security policy file 126 along with their resultant behavior based on the instant principles are provided below:

1. <path>/us-west-1/*/*</path>
<crypto_policy>SingleKey, WK ID1</crypto_policy>
Encrypt the file-keys of any file in any directory/bucket occurring in directory-tree or region us-west-1 by a single wrapping-key WK1 identified by WK ID1.

2. <path>/*/secretbucket/*</path>
<crypto_policy>SingleKey, WK ID2 </crypto_policy>
Encrypt the file-keys of any file in the directory/bucket secretbucket whichever directory-tree or region it is in, with a single wrapping-key WK2 identified by WK ID2. Note, that WK ID1 and WK ID2 may or may not be the same without departing from the instant principles.

3. <path>/*/secretbucket/*/</path>
<crypto_policy>IndividualKey</crypto_policy>
Encrypt the file-keys of all the files in the directory/bucket secretbucket with their unique wrapping-keys.

4. <path>/*/secretbucket/secure-*</path>
<crypto_policy>IndividualKey</crypto_policy>
Encrypt the file-keys of just the files starting with "secure-" in the directory/tree secretbucket with their unique wrapping-keys.

An additional configuration for each policy definition above contains the key rotation intervals or time periods for the files matching that policy definition. Specifically, one configuration specifies the maximum time period by which the wrapping-key of the file should be rotated, and another entry specifies the maximum time period by which the file-key of the file should be rotated. These configurations may be contained within markups such as <filekeyrotationperiod></filekeyrotationperiod> and <wrappingkeyrotationperiod></wrappingkeyrotationperiod>, as an example.

In a specific implementation, a single key rotation period is specified for just the wrapping key WK contained within markups <key_rotation></key_rotation> for each policy definition. In such an implementation, the file keys can have a predetermined or a hardcoded rotation period or they may not be rotated at all. Further, a key-count within markups <key_count></key_count> is specified for each policy definition in <policy></policy>. Based on this count, the admin tool generates the required number of WK's for the paths specified in the policy definition and stores them in security policy/configuration file 126 before the policy distribution.

Additionally, a not-after date is also specified for each WK ID in each Single Key policy definition, within markups <not_after_date></not_after_date>. This is the date after which the specific WK will be deactivated once the admin tool to be explained further below, is executed. The WK ID is contained within <key_id></key_id>. The keys generated by the admin tool per above, have not-after dates that are spaced apart by the key rotation period.

Thus, if the above-mentioned admin tool is run before the first not-after date, it will enforce/activate the corresponding first WK. If it is run after the first not-after date and before the second not-after date, it will deactivate the first WK and activate/enforce the second WK and so on. Note that for Individual Key policy definitions, the key-count will be 0 and no keys are generated per above explanation.

The policy definitions for the above specific implementation are provided below using the markups explained above and others that will be self-explanatory to the skilled reader. These policy definitions pertain to a "SomeSingleKeyPolicy" of an exemplary policy definition of type Single Key, and a "SomeIndividualKeyPolicy" of an exemplary policy definition of type Individual Key:

SomeSingleKeyPolicy:

```
<policy>
    <policy_name>SomeSingleKeyPolicy</policy_name>
    <paths>
    <path>/*/zts-*/qq</path>
    <path>/*/zts-*/tt</path>
        </paths>
    <encryption>
    <crypto_policy>single_key</crypto_policy>
    <key_count>2</key_count>
    <keys>
    <key>
    <key_id>1368a2b7-00bc-4ae2-a3ff-db4a6e598aad</key_id>
    <not_after_date>2017-04-01</not_after_date>
    </key>
    <key>
    <key_id>69609e00-c345-11e7-873e-843a4b033e80</key_id>
    <not_after_date>2017-06-30</not_after_date>
    </key>
    </keys>
    <key_spec>
    <key_rotation>90d</key_rotation>
    </key_spec>
    </encryption>
    </policy>
```

SomeIndivivalKeyPolicy:

```
<policy_name>SomeIndividualKeyPolicy</policy_name>
<paths>
<path>/*/zts/ik/*</path>
</paths>
<encryption>
<crypto_policy>individual_key</crypto_policy>
<key_count>0</key_count>
<key_spec>
<key_rotation>1w</key_rotation>
</key_spec>
</encryption>
</policy>
```

In the above implementation, the administrator does not need to specify the content between <keys></keys>, but rather only the key-count. That content is automatically filled in by the admin tool based on the type of policy (within <crypto_policy></crypto_policy>), key-count (within <key_count></key_count>) and key rotation period (within <key_rotation></key_rotation>).

Detailed Operation

After having described above the key aspects of the instant design, let us look at the operational working of the system in great detail. Referring again to FIG. 1 first, and as already noted, shim layer 105 is configured as an intermediary between user $U_1$ and cloud storage 106. More specifically, user $U_1$ accesses cloud storage 106 using a client application 103 and shim layer 105.

Now, storage requests or calls or file operations made by user $U_1$ on client device 102 via client 103 to cloud storage 106 are intercepted by shim 105. Such storage requests may be (i) a Get call/request to retrieve a secured/protected file $F_c$ from cloud storage or network 106 as a plaintext file $F_p$, (ii) a Put call/request to store a plaintext file $F_p$ as protected file $F_c$ into cloud storage 106, (iii) a copy call/request to copy a plaintext file $F_p$ that is stored in cloud storage 106 as protected file $F_c$ from one location in the cloud storage to another, or (iv) a delete call/request to delete/remove a protected file $F_c$ that is stored in cloud storage 106.

An exemplary use case of (i) above may be that user $U_1$ on device 102 wishes to work on file $F_p$ with a software application such as Microsoft Word or Excel. Similarly, a use case of (ii) above may be that user $U_1$ wishes to update or store a file $F_p$ that he/she has just worked on or updated via some application on device 102. Similar or other use cases for (iii) and (iv) are readily conceived.

Of the above file operations/requests/calls, shim layer 105 intercepts and services Get request (i), Put request (ii) and Copy request (iii), while Delete request (iv) is simply "passed through" to the API of cloud storage 106. Let us now look at the servicing of these file operations, calls or requests performed by shim layer 105 in conjunction with other modules of system 100 in greater detail.

Get File Operation:

FIG. 4 shows the operational flow or flow diagram of a Get file request/call/operation in a flowchart 300. More specifically, when a client running on device 102 of user $U_1$ of FIG. 1, or simply the client, wishes to read a protected file $F_c$ from cloud storage 106, it issues a Get request as shown by process/function/step box 302. As mentioned above and as indicated by process box 304, such a file operation/request is intercepted by shim 105 that is also installed on the client device and operates as an intermediary between client 103 and cloud storage 106 to which it interfaces via the available API of cloud storage or network 106.

In response to the interception of the Get request, and as indicated by box 306, shim 105 sends the path of file $F_c$ in cloud storage 106, and the credentials of user $U_1$ to policy server or engine 122. The path above preferably includes the bucket or directory where the file is stored as well as its filename, and is sufficient to uniquely identify file $F_c$ by employing the credentials of user $U_1$ in cloud storage 106. The credentials of user $U_1$ being referred to here are the credentials defined in cloud storage 106 and may be different from his/her credentials required for client network 124 of FIG. 1. Preferably, the cloud storage credentials of user $U_1$ are stored in a file stored on a device/system/server connected to client network 124.

Now, and referring still to FIG. 4 in conjunction with FIG. 1, process engine (PE) 122 attempts to read the metadata of file $F_c$, or file-metadata per above teachings, from cloud storage 106. This step is shown by box 308. File-metadata is stored in the extended attributes of file $F_c$ as already explained above. If the attempt fails because user $U_1$ could not be authenticated by cloud storage 106, or if user $U_1$ is authenticated but has insufficient permissions to perform the Get/read operation, then an error is returned and the Get operation is aborted. This is indicated by error box 310.

Note that process engine 122 above impersonates user $U_1$ by applying his credentials at cloud storage 106. This is possible because the client application running on device 102 is connected to client network 124 of FIG. 1 and as such trusts process engine 122 that is also connected to the same client network. Therefore, process engine 122 obtains the credentials of user $U_1$, for example, by reading a credentials file stored in network 124 of FIG. 1.

If the read attempt at box 308 succeeds but process engine 122 determines that file-metadata in $F_c$ does not exist, then this means that the file is not encrypted in cloud storage 106. As such, it is simply a plaintext file as shown by box 314. If this happens, process engine 122 simply informs shim 105 accordingly, which then reads the respective plaintext blocks $M_i$ of the file from cloud storage 106 and delivers them to the client application as plaintext file $F_p$ as shown by box 316.

If on the other hand, file-metadata exists indicating that file $F_c$ is indeed encrypted, then process engine 122 reads the WK ID attribute of file-metadata per above explanation (also see FIG. 2-3 and related explanation). It then queries key manager (KM) 118 of FIG. 1 with WK ID as shown by box 318. In response, and as shown by box 320, key manager returns the corresponding wrapping-key WK to process engine 122. At this point, and as shown by the step or box 322, process engine 122 performs an authenticated decryption of wrapped-file-key WFK attribute of file-metadata per Eq. 2B above by utilizing tag $T_{FK}$ also stored in file-metadata. If the authentication succeeds, then process engine 122 obtains the resulting file-key FK of the file. Otherwise, if the integrity check fails, an error is returned and the operation is aborted as shown again by error box 310.

Process engine 122 now returns FK to shim 105 as shown by step 324. Using as secret key (that is derived from file-key FK per above teachings), shim 105 now regenerates HMAC of all the attributes of file-metadata (except the HMAC attribute). A match of the resulting value with the HMAC value stored in file-metadata will verify the integrity of file-metadata. The HMAC regeneration step is shown by box 326 and the verification step is shown by decision diamond 328. If the regenerated and stored HMAC values do not match, this shows that file-metadata has been tampered with or is corrupted. This results in an appropriate error message and the aborting of the operation as shown by error box 312.

If the HMAC is verified, then shim 105 begins sequentially reading data blocks $*C_i$ of file $F_c$ (see FIG. 2-3 and associated explanation) from cloud storage 106 by utilizing its respective API. Shim 105 then sequentially uses authenticated decryption of Eq. 1B with inputs file-key FK, per-block initialization vector $IV_i$, ciphertext block $C_i$, AAD (Sha-2 of Ver, block ID or sequence number and $IV_i$ fields) and tag $T_i$. If the inputs are authentic, then this operation results in plaintext block $M_i$. As already explained above, decryption will only be successful if the inputs including ciphertext block $C_i$, tag $T_i$ and AAD (Sha-2 of Ver, block ID or sequence number and $IV_i$ fields) are all authentic/verified.

Shim 105 then delivers the plaintext blocks $M_i$ of file $F_p$ corresponding to protected file $F_c$, to client application 103 of FIG. 1. This delivery may be block-by-block of plaintext blocks $M_i$, in chucks of blocks $M_i$ or the entire file $F_p$, as needed. The above process is indicated by box 330. If client application 103 had requested only certain data blocks $*C_i$ or a range of blocks $*C_i$ or a range of bytes from file $F_c$, only those respective blocks are read and delivered to the client. Thus, the present design is able to partially read/decrypt protected file $F_c$ without having to decrypt the entire file. If decryption fails due to an authentication failure of its inputs, an error message is displayed and the operation is aborted as shown by box 312.

In the preferred embodiment, additional integrity checks are also performed as each data block $*C_i$ is decrypted in step 330. These include checking the sequential nature of block ID or sequence numbers from the metadata of consecutive blocks to ensure that no deletion attack or a swapping attack per prior explanation has occurred on file $F_c$. If so, an error is displayed and the operation is aborted. These additional integrity checks are not explicitly shown in flowchart 300.

In the present design, because of the levels of isolation provided, shim 105 running on client device 102 in conjunction with client application 103, will only ever see file-key FK of the file to be decrypted, but never the wrapping-key WK. Hence, the compromise of one client device or client application and the associated shim, will only compromise the file-keys or files used by that device/application, and not others that may have employed the same wrapping-key WK for wrapping/encrypting their respective file-keys FK. This is an important advantage of the instant design.

Get Operation for a Range of Bytes:

In accordance with the present teachings, the size of data blocks $*C_i$ is a standard fixed length. As such, and as noted above, two types of Get operations can be supported: (i) Get entire file as provided above by flowchart 300 of FIG. 4 and associated explanation, and (ii) Get a range of bytes. The latter is a variation of (i) and possible because the number of data blocks $*C_i$ to read for a range of bytes from a secured file $F_c$ can be easily computed given their fixed or predetermined size. Then, step 330 of flowchart 300 can be executed for only that many blocks to support operation (ii) above without having to decrypt the whole file. This is an important advantage of the design. Of course, the last data block $*C_i$ of the file can be less than the fixed size and may thus be variable in size. Operation (ii) will fail if the range of bytes provided in its arguments exceeds the size or bounds of the ciphertext file $F_c$.

Put File Operation:

FIG. 5 shows the operational flow or flow diagram of a Put file request/call/operation in a flowchart 400. Let us now review that in conjunction with FIG. 1. More specifically, when a client running on device 102 of user $U_1$ of FIG. 1, or simply the client, wishes to write a file $F_p$ as a protected file $F_c$ into cloud storage 106, it issues a Put request as shown by process/function/step box 402. As mentioned above and as indicated by process box 404, such a file operation/request is intercepted by shim 105 that is also installed on the client device and operates as an intermediary between client 103 and cloud storage 106 to which it interfaces via the available API of cloud storage or network 106. In response to the interception of the Put request, and as indicated by box 406, shim 105 sends the path of file $F_c$ in the cloud storage, and the credentials of user $U_1$ to policy server or engine 122. The path above preferably includes the bucket or directory where the file is to be stored as well as its filename.

Now, and referring still to FIG. 5 in conjunction with FIG. 1, process engine (PE) 122 consults security policy 126 to determine whether plaintext file $F_p$ is to be stored as encrypted file $F_c$ or not. Policy engine/server 122 does that by matching the path and the name of the file against the various policy definitions stored in policy 126 per above explanation. If policy engine 122 finds a match in one of the policy definitions, then that means that plaintext file $F_p$ is to be stored as encrypted, ciphertext file $F_c$ in cloud storage 106, otherwise not. If the file is not to be encrypted as shown by box/step 410, then shim 105 starts writing consecutive blocks $M_i$ of file $F_p$ in cloud storage 106 for the client. This process is shown by box 412, during which if cloud storage 106 returns invalid user credentials or insufficient permissions, an error is returned and the operation is aborted, although this step is not explicitly shown in flowchart 400 to avoid clutter.

If on the other hand, plaintext file $F_p$ is to be encrypted and stored as protected file $F_c$, process engine 122 reads the corresponding WK ID, or the ID of wrapping-key WK, stored in policy 126 per above teachings. This is shown by box 414. It then queries key manager (KM) 118 with WK ID. In response, key manager 118 returns wrapping-key WK to policy engine 122 as indicated by step/box 416. Now policy engine 122 generates a new file-key FK for the file as shown by box 418, and wraps/encrypts it by wrapping-key WK to obtain wrapped-file-key WFK and corresponding authentication tag $T_{FK}$ as indicated by box 420. For this purpose, it utilizes authenticated encryption of Eq. 2A with $IV_{FK}$ taught above. It then sends file-key FK, wrapped-file-key WFK, tag $T_{FK}$ and WK ID to shim 105 running on device 102.

In alternative variations, the task of the generation of new file-key FK can also be done by key manager 118. In this case, policy engine 122 will request key manager 118 to generate the new file-key and return it the newly generated file-key FK. In still other variations, a new file-key FK is generated only when it is a new file that is being written. For an existing file, policy engine 122 simply unwraps the wrapped-file-key WFK read from file-metadata (by first obtaining WK from key manager per above) to obtain the existing file-key FK and returns that to shim 105. These variations are not shown in operational flow 400 to avoid detraction from the main principles.

It is also possible that a new wrapping-key WK also needs to be generated. That can happen if a Single Key policy definition matching a new or existing file in policy 126 does not contain a WK ID, for instance because the policy was just updated or edited by the administrator. As will be explained further below, in this case, the administrator tool is run to generate the missing wrapping-keys WK and store corresponding WK ID's into policy 126. Again, this scenario is not explicitly indicated in operational flow 400 of FIG. 5. Once more we see that because of the isolation provided by the instant design, client 103 and shim 105 (or any other application on device 102) do not ever have access to the wrapping-key WK, thus preventing possible compromise of a large number of file-keys.

At this stage, shim 105 has all the component attributes to construct file-metadata attribute shown in FIG. 2-3 for file $F_c$. More specifically, if file $F_c$ is an existing file, then the fields version, FK Rotation Date, WK Rotation Date, $IV_{FK}$ will already be present in file-metadata stored in file $F_c$, and which shim 105 first reads from cloud-storage 106. Otherwise, shim 105 generates those fields to their default values. It then generates the HMAC signature of all the fields of file-metadata (except of course HMAC field) using file-key FK to derive the secret key, and attempts to write file-metadata of file $F_c$ in cloud storage 106.

If the credentials of user $U_1$ are invalid or if the user has insufficient permissions, then an error is returned and the operation is aborted, as shown by box 426. Recall that the credentials of user $U_1$ being referred to here are the credentials defined in cloud storage 106 and may be different from his/her credentials required for client network 124 of FIG. 1. Preferably, the cloud storage credentials of user $U_1$ are stored in a file stored on a server connected to client network 124.

After writing file-metadata of file $F_c$ in the cloud, shim 105 is finally ready to encrypt contents of plaintext file $F_p$. As shown by step 428, it does this by sequentially using authenticated encryption of Eq. 1A above, taking as inputs file-key FK, per-block initialization vector $IV_i$, plaintext block $M_i$ and an AAD of Sha-2 hash of fields Ver, block ID or sequence number and $IV_i$. The encryption operation results in a ciphertext block $C_i$ and authentication tag $T_i$.

As noted above, each block is encrypted by file-key FK and a different, and preferably randomly generated initialization vector $IV_i$. Further, as also taught above, the version number field Ver, block ID or sequence number, $IV_i$ and authentication tag $T_i$, constitute the block metadata for the block, or block-metadata$_i$. Together, block-metadata$_i$ and ciphertext block $C_i$ constitute data block $*C_i$ of protected file $F_c$ per above teachings. Thus, shim 105 successively applies Eq. 1A to each plaintext block $M_i$ of plaintext file $F_p$ to obtain corresponding data block $*C_i$ of ciphertext, encrypted file $F_c$ which it then writes in cloud storage 106 for the client.

Copy File Operation:

According to the instant design, a Copy operation is implemented as a combination of a Get and Put operation taught above. More specifically, shim 105 obtains plaintext blocks $M_i$ of the source file to be copied as per step 330 of flowchart 300 of FIG. 4. However, instead of returning plaintext blocks $M_i$ to client 103, it writes them back to cloud storage 106 per step 428 of flowchart 400 of FIG. 5. For this purpose, it utilizes file-key FK, wrapped-file-key WFK and WK ID of the destination file—as if it were doing a Put operation of the destination file. Explained even further, it executes steps 302 through 330 of flowchart 300 of FIG. 4 for the source file, and then steps 402 through 428 of flowchart 400 of FIG. 5 for the destination file. This way the file gets encrypted according to the policy definition for the destination location.

Delete Operation:

A Delete operation by client 103 of FIG. 1 is simply passed through by Shim 105 to cloud storage 106 by utilizing its respective Delete operation API.

After having described the various file operations supported by the secure cloud storage system of the present design, let us now look at its various other administrative and architectural properties. As noted above, file-metadata is stored in extended attributes of a file. For Amazon S3, these extended/external attributes can currently have a maximum size of 2 kilobytes, although other implementations may not have such a restriction.

Further, the present technology can support many types of clients. A client application such as client 103 along with shim 105 of FIG. 1 can be built using a vast variety of software and even firmware and hardware technologies that can carry out their respective operational steps explained in the flowcharts of FIG. 4-5.

Figure 6:
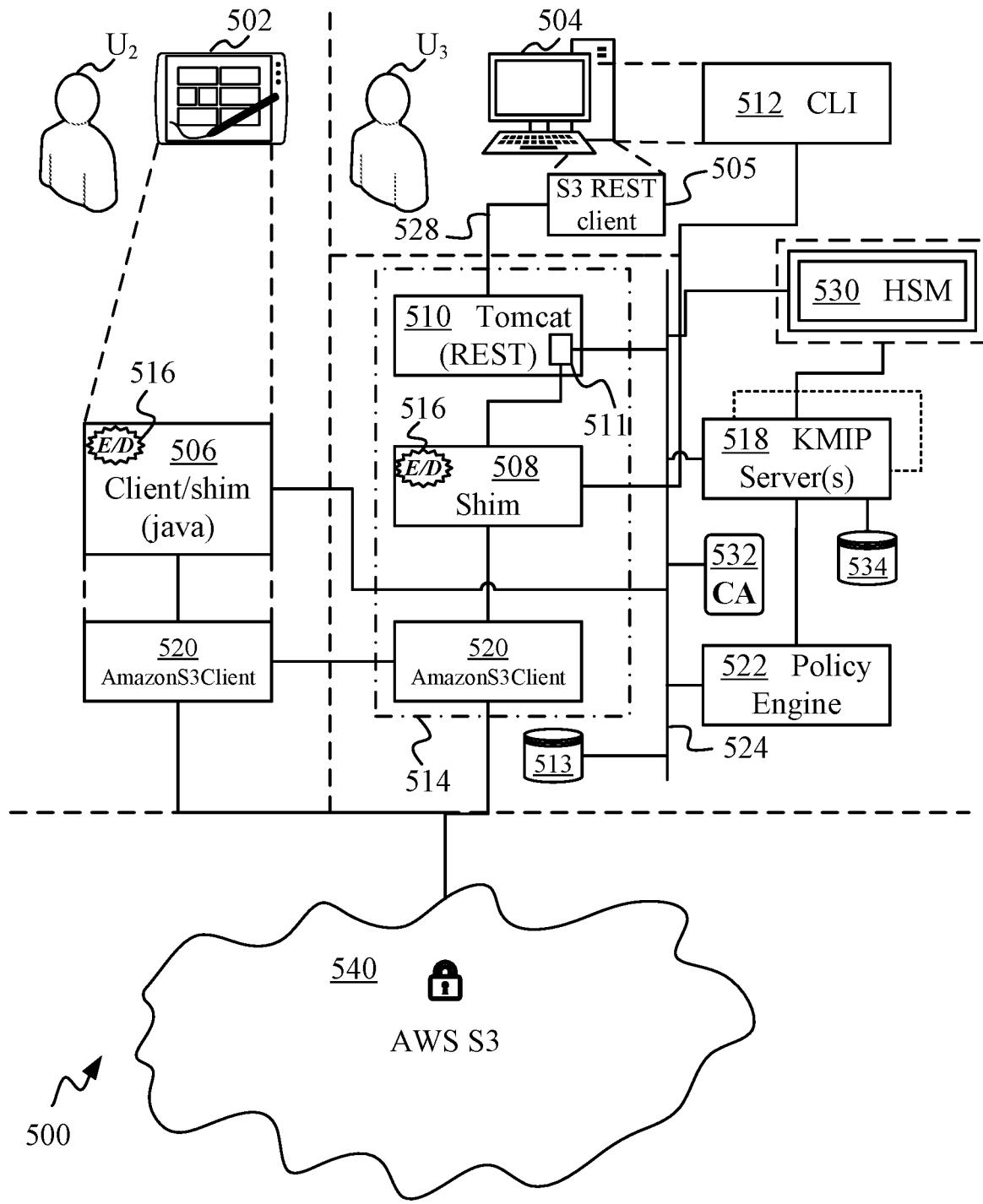
FIG. 6 is a detailed functional view and architecture showing a Java client, a REST client, a command line interface (CLI) client as well as a representational state transfer (REST) server.

The following is a detailed discussion of some exemplary clients used in the present system in its various preferred embodiments. For this purpose, let us take advantage of the architectural diagram of the instant cloud storage encryption system 500 showing its various components as illustrated in FIG. 6. FIG. 6 shows a specific embodiment that uses AWS S3 for its cloud storage 540, although cloud storages from other vendors are easily conceivable in the present scope. The lock symbol on cloud storage 540 indicates that it is secured according to the instant principles.

Java Client:

In a preferred embodiment, the client is implemented in Java such as by using Java Development Kit (JDK). Analogous designs in other programming languages are easily conceived. Java client 506 shown in FIG. 6 is used by user $U_2$ using a tablet 502, analogously to user $U_1$ of the embodiment of FIG. 1. Note that Java client 506 is implemented as a compatibility or shim layer taught above in reference to FIG. 1. Explained further, while FIG. 1 explicitly separated client 103 from shim 105, this distinction is removed from FIG. 6 because of the close cooperation between the two modules. As such, client 506 may also be referred to as a client or shim or client/shim 506. Any higher-level code executing in/on device 502 of user $U_2$ is not explicitly shown in FIG. 6 to avoid detraction from the main principles being taught. As per above teachings, client/shim 506 traps and services Get, Put and Copy calls from such a higher-level code.

A useful way to implement client/shim 506 is to have its code or class/sub-routine that implements encryption/decryption, subclass or inherit from the corresponding encryption/decryption class of AWS S3 such as AmazonS3EncryptionClient( ) that inherits from AmazonS3Client( ). This encryption/decryption client class is explicitly shown in FIG. 6 by reference numeral 516. Note that class 516 may also inherit from any other appropriate parent class of AWS S3 as required for a given implementation.

Client 506 interacts with S3 cloud storage 540 via its cloud API or the above-mentioned parent class AmazonS3Client( ) marked by reference numeral 520 in FIG. 6. According to the present design, class 516 then presents a same/similar interface as parent class 520 to any higher-level client code executing on device 502 with no or minimal modifications. This way any prior higher-level code existing on client device 502 does not need to be changed or minimally changed. In the preferred embodiment, class 516 has an identical interface as class 520 so no changes to any existing higher level prior client code are required. As noted above, any Delete call/request from such a higher-level code is passed through by client/shim 516 to its parent class 520 AmazonS3Client( ) which in turn interfaces with AWS S3 cloud storage 540 shown in FIG. 6. Preferably, class 516 also mimics the input and output behavior of parent class 520 which supports streams.

Implementing encryption/decryption in client class 516 rather than using AWS class(es) allows client 506 to overcome the restrictions of S3. Further, and in contrast to S3, this allows the use of AES GCM encryption explained in the above teachings. S3 only supports a single GCM resulting in a maximum file size that it can support of only 64 Gigabytes. Implementing AES GCM using client 506 via class 516 per above teachings overcomes this restriction. Additionally, this easily allows client class 516 to use OpenSSL cryptographic library.

Rather than implementing its own encryption/decryption, it is also possible for class 516 to use or call other external encryption/decryption libraries. In one such variation, a Java Native Interface (JNI) is used to call, for example, C crypto libraries from Java. Thus, the Java code that interfaces with AWS classes uses JNI to call external non-Java (native) crypto libraries such as C crypto libraries for encryption/decryption.

REST/RESTful Client:

The present design also affords the encryption/decryption of files from a representational state transfer (REST or RESTful) architecture based client, or simply a REST or RESTful client. Such a REST client interfaces with a web server in the design illustrated in FIG. 6. Specifically, a user $U_3$ working on client device or desktop 504 wishes to access S3 cloud storage 540 in a secure manner by using an S3 REST client 505 according to the present techniques. S3 REST client 505 may be a graphical user interface (GUI) based client with the look-and-feel of a file browser, or a command line interface (CLI) client. In the preferred embodiment, it is a CLI client using Boto Python package, although client 505 may also be based on any other suitable technologies with or without a GUI.

FIG. 6 further shows a web server, preferably an Apache Tomcat server, 510. Web server 510 is a software server which may or may not have a dedicated hardware as will be recognized by those skilled in the art. In the embodiment shown, it is shown as executing on a computing device or hardware 514 shown within dotted-and-dashed line box. Server/device 514 may also be referred to as the internal REST server according to the present teachings. Of course, device or server 514 may be shared with other modules and systems connected to client network 524 shown in FIG. 6.

REST client 505 operating on device 504 accesses web server 510 using a uniform resource locator (URL) as will be explained further below. There is also a shim 508 similar to client/shim 506 explained above in reference to the Java client of the design. Shim 508 runs on REST server 514 and performs the same functions as client/shim 506 with the difference that client/shim 506 faces the higher-level code of end-user $U_2$, while the functionality of shim 508 is offered to end-user $U_3$ via web-server 510 to which REST client 505 connects. Explained further, web server 510 exposes the above-explained encryption/decryption class 516 in shim 508 using a uniform resource identifier (URI) that is referenced in the incoming URL from S3 REST client 505. Such a construct will be familiar to those skilled in the art of web systems design.

On the other hand, CLI client 512 explained further below, connects directly to shim 508 as needed to perform encryption/decryption by class 516, without having to connect via web-server 510. Now, there is also a plugin 511, preferably based on Java, deployed on web server 510. Plugin 511 is responsible for calling shim 508 with class 516. As already noted, and following REST design principles, S3 REST client 505 accesses web-server 510 and specifically class 516 using a URL required to encrypt/decrypt files. This URL is provided by user $U_3$ exemplarily on the command line of S3 REST client 505 running on device 504.

Thus, using an appropriate URL, user $U_3$ can encrypt/decrypt files on device 504. The filenames may also be passed as arguments or query fields of the URL. The interface/API to cloud storage 540 by shim 508 using class AmazonS3Client( ) 520 of AWS S3 is used presently in a similar fashion as explained in reference to Java client 506. Because anyone on the internet may attempt to connect server Tomcat 510 via the corresponding URL, it is important to have connection 528 be encrypted.

Therefore, preferably, network connection 528 with which device 504 running REST client 505 connects to web server 510 on device/server 514 is encrypted using HTTP-S and secure socket layer (SSL). Further, user $U_3$ on device 504 needs to be authenticated before it can access backend or server resources such as class 516 in shim 508 on device/server 514. Recall from operational flows 300 and 400 of FIG. 4-5 that the credentials of user $U_1$ for the cloud storage preferably exist in a file residing in the trusted client network. Those credentials are then used in operational flows 300 and 400 to authenticate user $U_1$, or to abort the operation with an error if the authentication fails.

However, a different scheme is employed for authenticating user $U_3$ for the analogous Get/Put/Copy operations of the present embodiment. Specifically, present REST client 505 sends a signature along with a URL request to web server 510. The signature is computed for user $U_3$ by S3 REST client 505 based on his/her credentials. It then sends the signature to server 510 via an HTTP (preferably HTTP-S) request URL. Now, based on the credentials of user $U_3$ stored on an appropriate module/system connected to client network 524, web server 510, and specifically plugin 511, computes the signature of user $U_3$. In the preferred embodiment, the credentials of user $U_3$ are stored in KMIP server 518.

If there is a match between the received and computed/generated signatures, then user $U_3$ is authenticated. In this case, web server 510 with plugin 511 uses the credentials of user $U_3$ to impersonate user $U_3$ and access S3 cloud storage, and the rest of the operation continues according to flows 300 and 400 explained earlier. Otherwise, if there is a mismatch of received and locally computed signatures, the request from user $U_3$ is rejected.

Preferably, the above authentication process is built using AWS S3 Version 4 protocol and the signature above is AWS S3 V4 signature. Such a signature is computed by successively applying Eq. 3 through Eq. 7 below.

| | |
|---|---|
| DateKey =<br>HMAC-SHA256("AWS4"+"<SecretAccessKey>","<yyyymmdd>") | Eq. 3 |
| DateRegionKey =<br>HMAC-SHA256(DateKey, "<aws-region>") | Eq. 4 |
| DateRegionServiceKey =<br>HMAC-SHA256(DateRegionKey, "<aws-service>") | Eq. 5 |
| SigningKey =<br>HMAC-SHA256(DateRegionServiceKey, "aws-request") | Eq. 6 |
| Signature =<br>Hex(HMAC-SHA256(SigningKey, StringToSign)) | Eq. 7 |

In Eq. 7 above, StringToSign depends on the type of the request specified in the incoming URL to web server 510 of FIG. 6. For further details about AWS S3 V4 and its signature computation, the reader is referred to the relevant pages of AWS documentation, such as http://docs.aws.amazon.com/AmazonS3/latest/API/sig-v4-authenticating-requests.html#auth-methods-intro. For variations, where a different cloud storage provider other than AWS is used, the analogous documentation from the vendor should be consulted for authentication of the REST client.

Referring to FIG. 6, S3 REST client 505 will know all the information required to compute the signature above for a file that it wishes to Get/Put/Copy/Delete. Specifically, it will know its own SecretAccessKey for Eq. 3. It will also know aws-region for Eq. 4 or simply region as explained earlier in reference to security policy 126 of FIG. 1. The value of aws-service is s3 for Eq. 5. At this stage, all the inputs for Eq. 6 are known. Thus, client code of REST client 505 computes the signature for user $U_3$ using Eq. (3)-Eq. (7) above and incorporates it in the HTTP/HTTPS headers of any Get/Put/Copy/Delete request/call URL to web-server 510 for accessing storage 540.

At web server 510, several measures are taken to protect the credentials of user $U_3$ from which the signature is generated to match with the signature received in the incoming URL above. According to the design, administrators of the present secure cloud storage system can add S3's SecretAccessKey's of the users in a database 513. Since a SecretAccessKey consists of an access key ID and a secret access key, the latter is protected separately in a key manager that is preferably compliant with KMIP protocol. Such a key manager is shown in FIG. 6 as a KMIP server 518. Note that there can be more than one such KMIP servers as indicated by the dotted-line box in FIG. 6.

Database 513 only holds the access key ID's of the users and corresponding KMIP object ID's as a map or mapping, thus isolating the database from the secret access keys of the users stored in KMIP server(s) 518 which in turn store the keys in a dedicated key database 534. Once the signature for user $U_3$ is verified per above explanation, web server 510 then retrieves the KMIP object ID for user $U_3$ from the above mapping in database 513. Then it queries KMIP server 518 with KMIP object ID to retrieve the secret access key stored therein. It then uses access key ID of user $U_3$ along with his/her secret access key thus obtained to send/retrieve or encrypt/decrypt files on behalf of user $U_3$, and according to earlier teachings in reference to the flowcharts of FIG. 4-5.

Figure 7:
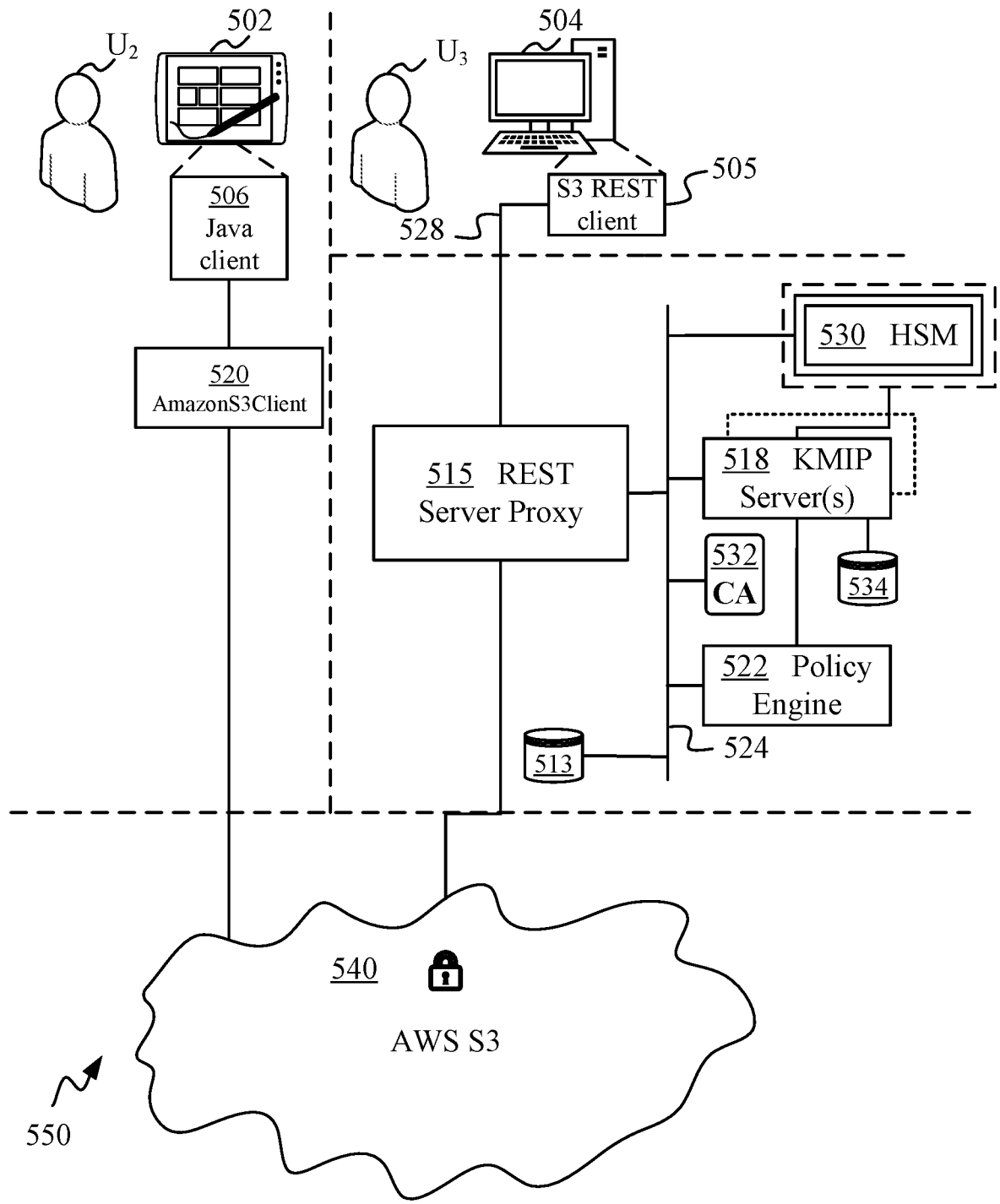
FIG. 7 is a variation of FIG. 6 showing how a proxy server may be deployed according to the present techniques.

In a very useful variation of the present embodiment, REST server 514 is configured as a proxy server for AWS S3 cloud storage service 540. Such an embodiment of secured cloud storage system 550 is shown explicitly in FIG. 7. FIG. 7 is a variation of FIG. 6 with many of the same elements and their reference numerals as FIG. 6 and several elements/components and numerals omitted from FIG. 6 for clarity, but presumed to be present. Further, FIG. 7 shows a REST server 515, which is the same as REST server 514 of FIG. 6, except that it is configured as a proxy server for AWS S3 cloud storage 540. In the present variation, any existing REST client, such as Boto for AWS S3, that used to access AWS S3 cloud storage 540 via its existing URL's can continue to use those URL's without modification.

As those familiar with the workings of a proxy server will appreciate, the above URL's are thus redirected to proxy server 515 instead of AWS S3 cloud storage 540. In other words, the URL's that any existing client code uses to access S3 cloud storage, can now without modification be directed to REST proxy server 515. Proxy server 514, on which the rest of the REST stack taught above (web server 510, shim 508 and AmazonS3Client 520) is installed but not shown in FIG. 7 for clarity, can then perform any desired encryption/decryption services for the clients completely transparently.

Command Line Interface (CLI) Client:

The present technology can also support a command line interface (CLI) client. Recall that in some embodiments the REST client taught above may also be a command-line client. However, the present CLI client being taught may specialize in providing administrative commands to the administrators and power users. Of course, the present CLI client may also provide CLI commands for performing routine file operations such as Get/Put/Copy/Delete. Such a client may be implemented from scratch or utilize an existing CLI technology (such as Boto package).

One administrative command/tool available in such a CLI client 512 shown in FIG. 6, is the "ztsfsck" command or the crawler. Analogous to the fsck command available in Linux/Unix file systems as known by skilled artisans, ztsfsck/crawler checks the cryptographic integrity of all the files stored in cloud storage 540. Note also that a user device, such as device 504 of user $U_3$ may deploy more than one clients. Thus, device 504 may access AWS S3 cloud storage 540 in a secured, encrypted manner according to the present techniques, both by REST client 505 and CLI client 512. As shown in FIG. 6 and per above teachings, CLI client 512 which may also be Python based, interfaces with REST Server 514. More specifically, and as noted earlier, it interfaces with shim 508 with encryption/decryption class 516 taught above in reference to client 506. Note, that it is possible that some commands/tools available in CLI client 512 may not require interfacing to shim 508 and instead interface directly to AWS S3 storage 540. FIG. 6 does not explicitly show these direct connections from CLI client 512 to cloud storage 540 to avoid clutter.

The rest of the applicable teachings of the earlier embodiments of Java client 506 and REST client 505 pertain to CLI client 512 as well. Of course, CLI client 512 can also use REST proxy server 515 shown in FIG. 7 and explained above for accessing AWS S3 cloud storage 540, without requiring any modifications to its access URL's. CLI client 512 or REST client 505 may use a properties file that contains the configuration for directing them to access AWS S3 via REST proxy server 515 of FIG. 7. This configuration information can also be passed in an environment variable of the CLI client, such as in the embodiments employing the Boto package.

According to the present techniques, the various clients of the system taught above are "light weight" in installation, and can be installed without requiring a full install of the software stacks. Furthermore, these clients may be remote and may be installed or added at any time without requiring a system downtime. The clients may support various operating systems, including the various flavors of Linux/Unix, MS Windows, etc.

Let us now look at the key management and security policy distribution processes of the present design in greater detail.

Key Management and Policy Distribution:

Referring again to FIG. 6-7, we see a hardware security module (HSM) identified by reference numeral 530. HSM 530 may be a software HSM, or softHSM, or a hardware HSM. As shown in the embodiments of FIG. 6-7, HSM 530 is a specially hardened and physical device as shown surrounded by a second solid-line box. It can be located on-premise/on-site at the customer site/location and connected to client network 524. Alternatively, it is located outside of the firewall of client network 524 and at a different site. This potential isolation of HSM 530 from client network 524 is indicated by the dashed box surrounding it.

As already taught above, KMIP server or key manager stores the wrapping-keys WK. Further, as per above explanation, it also stores the secret access keys of the users of the system in the embodiments deploying AWS S3. Alternatively, it stores the analogous credentials if other cloud storage services are deployed. Recall from above, that one retrieves a wrapping-key WK from KMIP server or key manager 518 by querying it with a WK ID, which is the object ID under which it stores the WK. Similarly, one retrieves the secret access key from server/manager 518 by querying it with the corresponding object ID under which it stores the secret access key. This latter object ID is stored in the mapping in database 513 per above teachings.

Typically, all the keys (wrapping-keys, secret access keys) in KMIP server 518 are stored in dedicated key database 534. Each entry of key database 534 is identified by an ID which may be a WK ID to identify a WK or the access key ID to identify a secret access key of AWS. In the preferred embodiment, these KMIP entries are further encrypted by a master key that resides in HSM 530.

More specifically, in order for KMIP server 518 to save a key (WK or secret access key) to its key database 534, it first sends the key to HSM 530. HSM maintains two master keys, one for encrypting any incoming key using a suitable algorithm such as AES-256, and the other to use as a secret key for computing an HMAC on the encrypted key and its metadata, such as its ID, owner, permissions, etc.

HSM 530 thus encrypts the key sent by KMIP server 518 and computes the HMAC and returns these values to KMIP server, which then saves these values in its key database 534. Thus, the entries in KMIP key database 534 only comprise of the master-key-encrypted keys with corresponding HMAC's, along with an ID for identifying the entry. Conversely, when KMIP server 518 needs to retrieve a key for a given ID, a WK ID for example, it looks up the entry in its key database. It then reads the respective master-key-encrypted WK and HMAC values corresponding to the WK ID, from its key database 534 and sends these values to HSM 530. HSM 530 first verifies the MAC using its master key that was used as the HMAC secret key above. If the authentication succeeds, it then decrypts the master-key-encrypted WK by its master key and returns the WK to KMIP server 518.

Recall briefly the querying of key manager 118 with a WK ID by policy engine 118 of FIG. 1 in steps 318-320 and 414-416 of flowcharts 300 and 400 respectively to obtain the corresponding WK. In the preferred embodiment, there is above-described handshake with an HSM that occurs between key manager 118 and the HSM for the Get and Put operations for the retrieval of WK, but is not explicitly shown in the flowcharts for clarity of illustration.

HSM 530 also preferably stores the private key for an internal certificate authority (CA) 532, that is used to issue digital certificates that are used by various modules/components of the system to authenticate themselves and secure respective connections on client network 524. Such connections include amongst others, those between policy engine 522, HSM 530, KMIP server 518 as well as REST server 514 of FIG. 6 or alternatively REST proxy server 515 of FIG. 7. These also include connections from client/shim 506 or shim 508 to other system components/modules.

Skilled artisans will understand the basic principles behind an authentication mechanism using a CA. It is often desired that rather than using an external CA, an internal CA be deployed on-premise at the customer site to efficiently and cost effectively issue digital certificates to the systems connected to a client network. These certificates are protected by a public-private key pair of the CA, and it is this private key that is protected in HSM 530 of system 500 of FIG. 6-7. It should be noted that having an internal CA such as CA 532 in FIG. 6-7 is not a requirement of the present design, which can support having an external CA as well.

Preferably, HSM 530 further hides its data using additional layers of encryption with other obscured keys. These obscured keys may be randomly generated and then stored in HSM 530 or on other secure locations remote from system 500 and 550 shown in FIG. 6 and FIG. 7 respectively.

Both KMIP server 518, also referred to simply as a KMIP-compliant key manager (see key manager 118 of FIG. 1 and associated explanation), as well as HSM 530 may be supplied to a customer or alternatively they may be separately owned by the customer and then incorporated into the present secured cloud storage system. It is often the case that a customer-owned KMIP server is its own certificate authority (CA) that issues digital certificates to the components/modules/servers connected to client network 524 of FIG. 6-7. In such a scenario, internal CA 532 is not needed and can be turned off.

Figure 8:
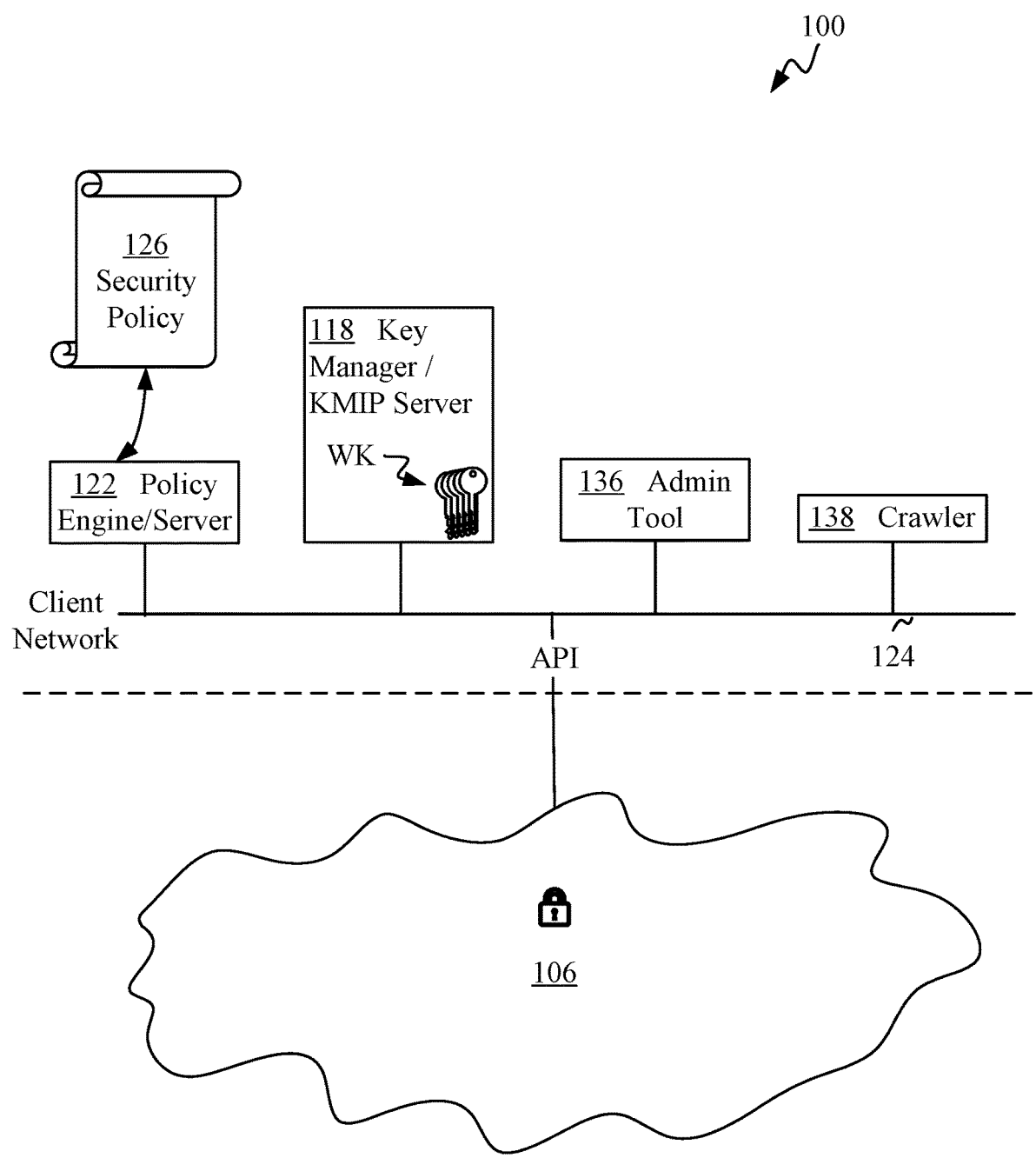
FIG. 8 is a functional overview and architecture highlighting the instant administrative tools.

Policy Administration/Enforcement and Administrative Tools:

Key management and policy administration, enforcement or implementation are facilitated by using one or more administrative tools according to the present design. To understand this functionality of the administrative tools better, let us turn our attention to FIG. 8. FIG. 8 is a variation of FIG. 1 with several components and reference numerals removed for clarity. FIG. 8 also shows an administrative tool and a crawler of the present design marked by reference numerals 136 and 138 respectively. These tools may be run by an administrator or a power user. Administrative tool 136 and/or crawler 138 of FIG. 8 may be invoked from CLI client 512 of FIG. 6 discussed earlier, and which is not shown in FIG. 8 to avoid detraction. Furthermore, the functionality of tools 136 and 138 explained herein may also be combined into a single tool.

As will be discussed further below, security/configuration policy file 126 exists in an encrypted or signed state in system 100. One function supported by administrative tool 136 is the generation of wrapping-keys WK. Recall from "Policy Definitions" section above that for Single Key policy definitions, the wrapping-key ID, WK ID, is stored in the policy with the policy definition. Any time, a new Single Key policy definition is added to the policy, administrative tool 136 is run. Whenever policy 126 is edited, an unsigned or decrypted copy of the policy is created for editing, and it is in this copy of the policy that any such new policy definition is added, or an existing definition edited.

As such, administrative tool 136 determines which entries/definitions in the newly edited security policy are Single Key and do not have a wrapping-key ID. It then invokes/requests key manager or KMIP server 118 to generate a new wrapping-key WK, which in turn creates and stores the new WK and returns the WK ID of the new WK to administrative tool 136. In other variations, policy engine 122 itself generates the new wrapping-key WK and sends the WK and WK ID to KMIP server 118 for storage. Still alternatively, policy engine 122 only sends KMIP server 118 the newly generated WK which then returns it the WK ID. Recall again here the key storage handshake between KMIP server 118 and an HSM (not shown) that may happen behind the scenes.

In a specific embodiment taught above that utilizes a key-count value in Single Key policy definitions, the required number of WK's are generated as required by the key-count by applying the above teachings. In any event, administrative tool 136 then writes the new WK ID(s) into the new/edited policy definition in the newly edited policy. In the above-mentioned specific embodiment, it writes the new WK ID's within the <keys></keys> markups per above teachings. In any case, at this stage, the policy is still unsigned. Administrative tool 136 thus asks policy engine 122 to sign or encrypt the policy which is then used by system 100, and the unsigned policy is deleted.

Figure 9:
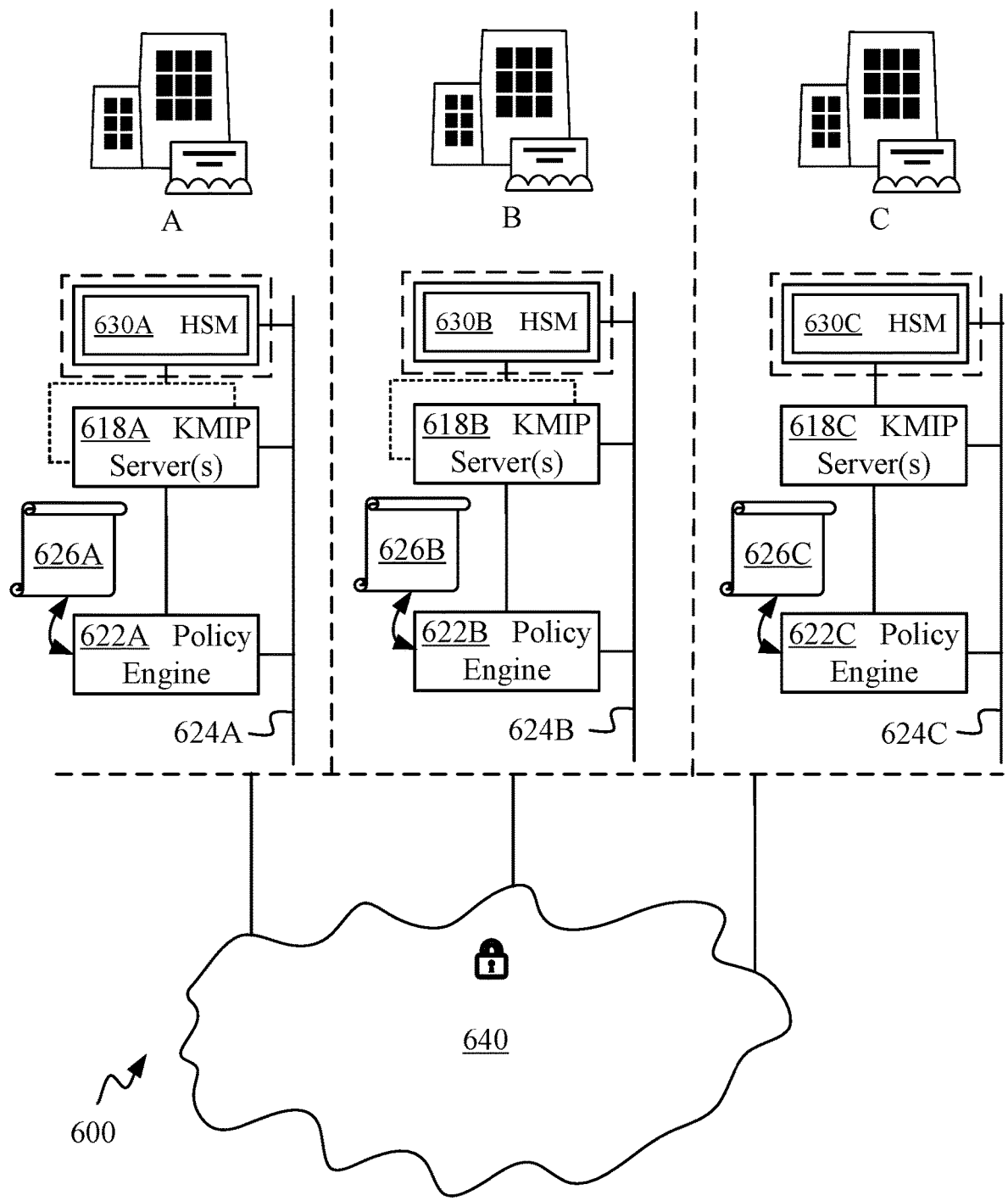
FIG. 9 illustrates a multi-site configuration using a secured cloud storage according to the present techniques.

In a highly useful variation of the above design, a customer deployment involves many different physical sites. Such a variation is shown in FIG. 9 with three customer sites A, B, C with their own local client networks 624A, 624B and 624C respectively according to above teachings. Site A has KMIP server(s) 618A, site B has KMIP server(s) 618B and site C has one KMIP server 618C. These key managers or KMIP servers respectively use security policies 626A, 626B and 626C.

The advantage of having multiple KMIP servers at sites A and B is that each KMIP server may be dedicated for different types of files in cloud storage 106. For instance, one KMIP server may hold the wrapping-keys WK for region-1, another for region-2, etc. Alternatively, one KMIP server may be used for primary files, while another for backup files, etc. This flexibility affords supporting implementations where the KMIP servers may be on separate un-connected networks 624A, 624B and 624C, or even belong to different customers at sites A, B and C, but which still need to access the same data in cloud storage 640.

The multi-site embodiment of FIG. 9 also shows HSM's 630A, 630B and 630C. It is not required for each site to have its own HSM as long as it has network connectivity to other sites with HSM('s) or to a common networked HSM. Present techniques may be practiced when one or more sites do not have access to a physical or hardware HSM. In such a scenario, the design may be implemented on those site(s) using a software or softHSM that emulates the behavior of a hardware HSM, but in software. Still in other variations, there may not be an HSM at all, software or hardware. Such an implementation is not able to take advantage of the utility of the HSM for storing the master keys and the certificate authority (CA) private key taught above. In such an embodiment, the handshake between KMIP server and the HSM as described above is not required.

For the multi-site configuration of FIG. 9, the policy engine of one site is designated as the master policy engine/server. Let us assume, that policy engine/server 622A is the master policy engine. Only policy 626A, or the master policy, at site A and used by master policy engine 622A may be edited/updated according to above teachings. Then once the editing is completed, and the administrative tool has been run to generate any requisite wrapping-keys WK per above discussion, master policy 626A is signed and distributed.

This is accomplished using the familiar cryptographic public/private key based digital signature security paradigm well understood in the art. Specifically, a master public key is shared between all policy engines 622A-C. When master policy engine 622A distributes a new policy or a policy update, it signs/encrypts the new policy with its master private key to produce a digital signature. The signature is protected from tampering/modification because an attacker cannot correctly modify the signature in a computationally feasible manner and still obtain the decrypted file. In this scenario, the private key used by master policy engine 622A is also preferably stored in HSM 630A.

Signed policy distribution is via cloud storage 640 itself. This allows remote sites B and C that may not have a direct network connection to master policy engine 622A to receive the signed policy. Specifically, the signed master policy 622A is uploaded to cloud storage 640 in a specific location or bucket configurable by the administrator and that is readable by all sites/users. Other policy engines 622B and 622C (or any others), periodically read the attributes of master policy 622A in the cloud to check if the creation time of the policy is newer than existing policies 626B and 626C. If the policy has changed, they download the new policy.

After receiving the signed policy from the cloud, policy engines 622B-C authenticate its signature to verify that the file indeed originated from master policy engine 622A, because they can decrypt it using the master public key to obtain the new policy or policy update. Finally, they deploy the new/updated configuration/security policy 626B, 626C. This completes the policy distribution process. The details of public key cryptography and digital signatures will be well understood by skilled artisans and not further delved into in this specification.

To understand another function of the administrative tools described herein, and while referring to FIG. 8, note that cloud storage 106 may allow the deletion of a file through its own user interface, such as a console, without an explicit knowledge of system 100. In such a scenario, if the file being deleted is the last file using a wrapping-key WK, then that wrapping-key WK needs to be "aged out" or retired or revoked.

In order to accomplish this, the present design stores additional data in the attributes fields in KMIP server 118. As will be appreciated by skilled artisans, these attributes may contain the mutable metadata in addition to the immutable values or keys stored according to the KMIP protocol. Thus, in the present design, these mutable attributes are used to store the path and filename, and preferably the region/directory-tree, bucket/directory and filename of the file to which the corresponding WK applies. KMIP server 118 of FIG. 8 thus holds the WK ID as well as the region/bucket/file to indicate as to exactly which files in cloud storage 106 the respective WK is applicable to.

Accordingly, let us look more closely at the crawler administrative tool 138. As already introduced earlier, the crawler or "ztsfsck" command is analogous to the fsck command available in Linux/Unix file systems as known by skilled artisans. Specifically, ztsfsck/crawler checks the cryptographic integrity of all the files stored in cloud storage 106. When invoked, crawler 138 iterates through all WK entries stored in KMIP server 118 (specifically its key database 534). In turn, KMIP server 118 may handshake with an HSM though we will leave that out from the present discussion to avoid detraction. For each WK, crawler 138 then accesses cloud storage 106 to determine if a matching region, bucket or file as specified in the KMIP mutable attributes above exists in the cloud or not. If there is no matching object in storage 106, then that WK is reported and can then be deleted, revoked or retired. Key deletion may be performed by administrative tool 136 or crawler 138.

In another interesting scenario, files from cloud storage 106 of FIG. 8, such as AWS S3, may be moved to an archival storage, such as Amazon Glacier, and then may later be brought back into storage 106. It is important in this case that corresponding wrapping-keys WK for which no files exist in cloud storage 106 are not automatically deleted. That is because, those keys should be reapplied to the files when they are brought back. As such, once crawler 138 identifies that there is no matching path/filename (region, bucket or filename) that match a WK, the respective WK ID/WK is checked by the administrator against the archival storage, and is only deleted/revoked if there is no matching entry in archival storage also. Key retirement/deletion as such tends to be a manual process, and its automation needs to be performed with care.

In a converse scenario of file deletion, a file may also be uploaded or stored in cloud storage 106 of FIG. 8 via its user interface or console, without explicit knowledge of system 100. Crawler 138 may be periodically run to encrypt all such files in storage 106 according to the present techniques and "rationalize" them against security policy 126. Recall from earlier that when a Single Key policy definition in policy 126 is added or edited, administrative tool 136 is run to generate the new WK and store corresponding WK ID in the policy.

More specifically, crawler 138 can be periodically run to perform all the integrity and signature checks taught above, on all or a subset of the stored files (as specified in its arguments), and to report any errors encountered. Crawler 138 may be selectively invoked to run on a directory-tree/region, a bucket/directory or a file. As yet another function of administrative tools 136 and 138, all WK ID's stored in the key managers may be reported. This can help administrators determine which keys may be revoked.

Recall that after an update to security policy 126 of FIG. 8, administrative tool 136 is run to incorporate the WK ID's into the policy for any affected policy definitions per above explanation. However, file-metadata of the files affected by this change still needs to be updated. This update may involve wrapping the file-key FK with the new WK if the file is being newly encrypted (affected by this change), or unwrapping the existing wrapped-file-key WFK by the old WK and then rewrapping the file-key FK by the new WK and storing resulting WFK and WK ID in file-metadata.

Such a rationalization/reconciliation of the files is also accomplished by an execution/run of crawler 138 of FIG. 8. FIG. 10 shows a screenshot 690 of the output of crawler 138 implemented as a command line tool ztsfsck in an exemplary implementation and as per earlier teachings. As shown, crawler 138 rationalizes/encrypts a file "words" in a region "us-west-2" in bucket "zts:zts-xxxxx-test" at the line of the output marked by reference numeral 692.

Still another function performed by tool/crawler 138 is key rotation. Recall from above teachings that security policy 126 also holds the file-key rotation period and wrapping-key rotation period for each policy definition. These time periods apply to any file matching the corresponding policy definition. When invoked for key rotation, crawler 138 reads file-key rotation date and wrapping-key rotation date fields from file-metadata attribute of each file (or a subset of files as specified in its arguments) in storage 106 (see also FIG. 2-3 and associated explanation). If the file-key rotation date or wrapping-key rotation date of a file plus the corresponding key rotation time periods or intervals specified for the matching policy definition in policy 126 is less than or equal to the current date/time, then crawler 138 rotates the file-key FK and/or the wrapping-key WK for the file as needed.

For this purpose, in the preferred embodiment, tool 138 simply performs a Copy operation as taught above with the source file and destination file being the same. This generates new keys for the file and overwrites the older file with the newer one. Alternatively, it may also rotate file FK independently of wrapping-key WK. Since the rotation of FK requires re-encrypting the file data, that is a lot more resource intensive operation than just rotating wrapping-key WK. Therefore, it is advantageous to separate the two functions and execute them as warranted.

As will be apparent from the many embodiments discussed above that the present invention may be practiced in a variety of contexts. Some of the key uses cases supported by the present technology include:

1. The cloud storage (such as AWS S3) is used as a data store only. Data processing is done on customer equipment connected to a client network.
2. A variation of (1) above but where data processing is moved to a "compute cloud" (such as AWS EC2 instances).
3. A variation of (2) above but where instead of a simple data store, a virtually scalable and persistent storage (such as AWS EBS) is used.

The embodiments taught above focused on the first use case (1) above. Let us now explain uses case (2) and (3) as variations of (1) in the following discussion.

Support for Data Processing in the Cloud:

To understand the support of use cases (2)-(3), let us take advantage of FIG. 11 showing how the above taught techniques for securing data in the cloud extend to data process/computation in the cloud. Specifically, FIG. 11 shows a cloud encryption system using a cloud 740 that has compute capabilities or servers or simply a compute cloud 748 as well as storage capabilities or servers/databases or a cloud storage 750. In the embodiment shown, compute cloud 748 and cloud storage 750 are a part of the same cloud 740 although this is not a requirement. Cloud encryption system 700 also has a user $U_4$ operating device 702, which may be a laptop or any other computing device.

User $U_4$ is an administrator or a power user who executes scripts 710 on compute cloud 748 that instantiate and execute various components of the instant cloud encryption/securing techniques taught above. Specifically, scripts 710 are used to instantiate/execute in cloud 740, a shim 708 with our encryption/decryption class 516, policy server 722, key manager or KMIP server (or servers) 718 as well as administrative tool 736 and crawler 738. All these tools were explained earlier in relation to other embodiments, but are shown with newer reference numerals in FIG. 11 to emphasize the present context of cloud-based data processing.

The instant components or modules in the cloud interact with cloud storage 750 as needed. One such interaction involves storing a security policy 726 in cloud storage 750 as shown. Cloud 740 also has an HSM 730 backing up key manager or KMIP server 718 as shown. FIG. 11 also shows a regular user $U_5$ using a client 720 to secure data in cloud 740 according to the above taught techniques. Client 720 may be any of the above taught clients of the present design. User $U_5$ is specifically shown connecting to shim 708 for this purpose which is also executing in cloud 740. A REST server 714 analogous to server 514 of FIG. 6 is also installed and executed via scripts 710 in cloud 740 and to which user $U_5$ connects via client 720. FIG. 11 also shows an internal certificate authority (CA) 532 taught earlier to issue digital certificates for the authentication of various components/servers in system 700. Note that not all physical connections between the various components/modules in cloud 740 are explicitly shown in FIG. 11 to avoid clutter.

In one variation of the present embodiment, cloud 740 of FIG. 11 is the AWS cloud, compute cloud 748 is the AWS elastic compute cloud (EC2) and cloud storage 750 is either AWS S3 or alternatively AWS EBS. HSM 730 in such an environment may be provided by Amazon (such as Safenet's Luna product or any others). In the present variation, administrator 702 runs scripts 710 on AWS EC2 748 as Amazon EC2 Run Command. Amazon EC2 Run Command provides a way of automating common administrative tasks like executing Shell scripts and commands on Linux, running PowerShell commands on Windows, installing software or patches, etc.

Thus, prior teachings, including the steps for performing Get, Put, Copy, Delete operations explained along with operational flows of FIG. 4-5, as well as key management and administrative functions are all implemented as such scripts and apply to the present embodiment and its variations also. Since scripts 710 are uploaded by administrator $U_4$ to AWS EC2 where they are executed to instantiate the various modules of the system, no other specific installation of the system is required.

As noted above, cloud storage 750 secured by the present techniques may be a simple data store such as AWS S3, or persistent block storage volumes such as AWS elastic block store (EBS). AWS EBS provides scalable, persistent virtual disk partitions to AWS elastic compute cloud (EC2) instances. In a variation of the system shown in FIG. 11, KMIP server 718 is provided and hosted by a third party on a cloud different from cloud 740. In such a variation, HSM 730 is also preferably hosted in the same or another cloud as KMIP server 718. In this and other scenarios, as already noted in reference to use case (1) above, if KMIP server 718 also acts as a certificate authority, then CA 532 may not be needed.

Thus, according to the present design, as long as network connections between the compute and storage environments in the cloud (such as an AWS EC2-EBS setup), KMIP servers or key managers as well as HSM's are possible, the present techniques can be adapted to secure the data in the cloud storage. Further, and as mentioned earlier, multiple cloud vendors may also be used at a given time in many of the embodiments explained above. In such a scenario, respective cloud storage API's for each vendor will be used by the instant clients/shims taught above. Data may be segregated per vendor with instant clients/shims working with each vendor's cloud storage using their respective API's. Such a multi-vendor flexibility avoids a vendor "lock in" and prevents the need for vendor specific encryption for each vendor.

Support for Variable Sized Blocks:

In another set of highly useful variations of the above embodiments, support for variable block sizes is provided for cloud storage encryption. The motivation for this arises at least because many cloud storage clients send data in multiple chunks of varying size or append data in varying size chunks to existing files in the cloud storage. This may occur because of a multipart file upload operation in AWS S3 performed by client such as Boto, or it may just be the requirement of a given implementation that not all blocks written (Put) to the encrypted cloud storage be of the same size. As such, it is advantageous to not have to re-block those chunks into fixed block sizes for the Put operations.

Recall from earlier embodiments as explained in the sub-section entitled "Get operation for a range of bytes", our ability to read any given range of bytes or alternately stated, any sized blocks from encrypted file $F_c$. This ability of reading variable sized blocks is now being explicitly extended to the entire operation of the system in the present embodiments.

In the case of AWS S3 when multipart upload of a large file is performed by a client such as Boto, the file being Put or saved in AWS S3 gets decomposed into blocks of variable sizes. Referring back to FIG. 6, if REST client 505 is Boto, then a multipart upload or Put operation of a large file results in blocks of various sizes being written to cloud storage 540. For this to happen, additional code at REST server 510 and/or shims 506 and 508 has to manage the conversion of those variable sized blocks into fixed sized blocks $M_i$ of the earlier embodiments. A converse process happens during a Get operation. This ends up using resources and time that ought to be conserved as provided for by the present embodiments.

Let us now look at the present embodiments in greater detail. For this purpose, let us take advantage of FIG. 12. FIG. 12 is a variation of the block-level authenticated encryption of FIG. 2 presented earlier with some key differences. FIG. 12 depicts that plaintext blocks $M_i$ belonging to our file $F_p$ being worked on by user $U_1$ of FIG. 1 get encrypted block-by-block according to the teachings provided earlier. However, plaintext blocks $M_i$ of file $F_p$ designated by reference numeral 204 are now of variable sizes marked by reference numeral 802 in FIG. 12, instead of 202 of FIG. 2. Further, these variable size blocks are illustrated by the different sizes of these blocks shown in the drawing of FIG. 12. Corresponding to variable sized plaintext blocks $M_i$, encrypted data blocks $*C_i$, now also of variable sizes are shown by reference numeral 808 in FIG. 12. Note that since the rest of the fields/attributes of block-metadata$_i$ are of fixed size, it is actually the size of ciphertext blocks $C_i$ that varies according to the size of plaintext blocks $M_i$ being encrypted.

Additionally, file-metadata now shown by numeral 814 also contains three additional attributes, elements or fields. These attributes are default block size (DBS), block table (BT) and block lookaside table (BLT). DBS contains the default size of the blocks for file $F_p$ and BT contains the offsets and lengths of blocks that have a size not equal to DBS. In an exemplary implementation, DBS is specified in file-metadata in multiples of 1 kilobytes. The DBS can also be specified in the security policy taught in earlier embodiments. Thus, if a new file is being created, its DBS is determined from the configuration information applicable to that file as stored in the security policy per earlier explanation. Otherwise, a system-wide default value may be used for DBS.

During a Put/write operation for the file, if the request is to write a block of size other than DBS (or alternatively stated, if the request is for a number of bytes to be written not equal to DBS), then an entry for the physical offset where the block is being written in the cloud storage as well as the length of the block is made in BT. Thus, BT contains a series of pairs of entries, each consisting of the offset and length of the variable sized block stored in the cloud storage. Since most cloud storage vendors have a limitation on the size of file-metadata, approximately 2 kilobytes for AWS S3, once BT reaches capacity, it is stored in file $F_c$ in a secure encrypted manner and its offset and length are recorded in BLT.

In the present embodiments also, HMAC in file-metadata is computed on all other attributes of file-metadata (not including HMAC) and thus cryptographically ensures the integrity of these attributes. These attributes and the operation of variable block cloud storage encryption will be explained further below. In a similar manner and conversely to FIG. 3, FIG. 13 shows the authenticated decryption of the present embodiments for variable block sizes. Referring back to FIG. 2-3 and associated explanation, thus file-metadata defined in our class or attribute or structure ZtsData { } may thus be implemented as follows:

```
ZtsData {
    zts_int version
    zts_date dataKeyRotationDate
    zts_date WrappingKeyRotationDate
    zts_vector WrappingKeyId
    zts_vector iv
    zts_vector encryptedKey
    zts_vector encryptedKeyTag
    zts_int defaultBlockSize
    zts_table blockTable
    zts_table blockLookasideTable
    zts_vector signature
}
```

Notice the addition of the three fields/attributes to support the present embodiments, defaultBlockSize, blockTable and blockLookasideTable. Let us now look at the details of requisite file operations Get, Put, Copy and Delete for the present embodiments.

Get Operation:

To understand in detail the Get operation of the present embodiments, let us first revisit flowchart 300 of FIG. 4 explained earlier. Recall that flowchart 300 illustrates the steps required to carry out a read or a Get operation for a secured, encrypted file $F_c$ of fixed block sizes $C_i$ stored in cloud storage 106 of our cloud storage encryption system presented initially in FIG. 1. For Getting or reading data blocks $*C_i$ of variable sizes of FIG. 13, steps 302 through 328 of flowchart 300 per earlier explanation stay unchanged with the exception that decision diamond 328 now verifies the integrity of HMAC of file-metadata over all the fields of file-metadata including the three additional fields of DBS, BT and BLT of the present embodiments. Recall from earlier explanation that at decision diamond 328, shim 105 verifies the HMAC of the file metadata and proceeds to reading the file if the check succeeds and aborts otherwise.

At this point, let us take advantage of extension flowchart 350 provided in FIG. 14 that shows the steps after decision diamond 328 albeit with the modified functionality per above explanation to support the present embodiments. Each Get/read request of the present embodiments includes an offset in file $F_c$ from which the read is requested and the number of bytes (length) to be read from the offset. So, shim 105 first performs a look up of the BT and BLT metadata attributes to determine where the requested offset lies in file $F_c$. In other words, it determines from BT and BLT attributes, onto which physical offset of file $F_c$ in cloud storage 106 of FIG. 1, does the requested or virtual offset of the read request maps. This lookup logic is shown by box 354 in FIG. 14 and explained further below.

The lookup logic informs shim 105 which physical offset in cloud storage 106 the requested or virtual offset of the request maps to. It then reads the requested number of bytes or data block $*C_i$ at that offset. Recall that data block $*C_i$ contains block-metadata$_i$ of fixed size and the variable sized ciphertext block $C_i$. As per prior embodiments, shim 105 uses authenticated decryption of Eq. 1B with inputs file-key FK, per-block initialization vector $IV_i$, ciphertext block $C_i$, AAD (Sha-2 of Ver, block ID or sequence number and $IV_i$ fields) and tag $T_i$. If the inputs are authentic, then this operation results in plaintext block $M_i$ at the "looked up" offset in file $F_c$ to be passed to the client by the shim. As already explained above, decryption will only be successful if the inputs including ciphertext block $C_i$, tag $T_i$ and AAD (Sha-2 of Ver, block ID or sequence number and $IV_i$ fields) are all authentic/verified.

To understand the lookup logic of shim 105 in further detail, let us consider the following examples. To facilitate understanding, these examples purposely use values in bytes rather than kilobytes, megabytes, gigabytes, etc. Furthermore, to avoid detraction from the main principles of the present embodiments being taught, the following examples ignore the additional fields of block-metadata$_i$ contained in each data block $*C_i$. As such, the following examples assume that data block $*C_i$ is the same as ciphertext block $C_i$ being Get/read. Of course, the virtual/physical offsets of the below examples will be adjusted for the fixed size fields of block-metadata$_i$ in a given implementation.

It should also be noted that besides shim 105, this lookup logic may be implemented in another software code running alongside the shim on the client, or on tomcat server 510 of FIG. 6 as required for a given implementation.

EXAMPLE #1

1. DBS=5 bytes and at physical offset 10, there is a 2-byte block.
2. BT contains one entry, physical offset=10, length=2, or (physical offset, length)=(10,2).
3. Read request is for virtual offset=7, length=2 or two bytes starting at offset, or (virtual offset, length)=(7,2).
4. Shim 105 checks the BT and sees that there are no entries before 7+2 bytes. So, the block size in that area must be DBS.
5. Shim 105 reads and decrypts the 5 bytes starting at physical offset 5 per box 356 of flowchart 350 and the above explanation. It then returns the 2 bytes starting at physical offset 7 to the client. Note that in this example, physical offset=virtual offset.

EXAMPLE #2

1. DBS=5 and BT contains entries (physical offset, length)=(10,2) and (17,2).
2. Read request is for (virtual offset, length)=(21,6).
3. Shim 105 inspects (looks up) BT and notices that the last entry is (17,2). Therefore, the remaining blocks are of size DBS and the next block starts at 17+2=19 and is 5 bytes long.
4. Thus, the virtual offset of the read request is in that physical block but the length requested is longer. So, shim 105 reads and decrypts two DBS sized blocks starting at physical offsets 19 and 24 per box 356 of flowchart 350 and returns bytes 21-27 to the client.

EXAMPLE #3

1. DBS=5 and BLT contains an entry, physical offset=29, length=4, or 4 bytes of BT #1 stored at physical offset=29, or (29,4). BT #1 stored at physical offset 29 in cloud storage 105 contains entries (10,2) and (17,2).
2. Current BT contains nothing.
3. Read request=(21,6). Since, stored BT #1 at (29,4) is after (21,6), shim 105 knows that any alternate/irregular sized blocks that may affect the read will be listed in it. So, it reads and decrypts stored BT #1 and looks up in it to find the alternate blocks. The read operation for alternate blocks is as per Example #2 above.

EXAMPLE #4

1. DBS=5 and BLT contain entry (29,4).
2. Current BT contains nothing.
3. Read request=(34,3). Since, stored BT #1 at (29,4) is before (34,3), shim 105 knows that it cannot contain any entries that affect the read. Hence, it does not read/decrypt it. Since, there are no entries in the BT, any blocks after stored BT #1 must be of size DBS. However, shim 105 needs to factor in the 4-byte length of stored BT #1 to determine what physical offset the virtual offset of the read request maps to. That means the next DBS sized block starts at 29+4=33. Thus, virtual offsets/bytes 29-33 map to physical offsets 33-37 and virtual offsets/bytes 34-39 map to physical offsets 38-42. Shim 105 thus reads and decrypts the DBS sized block at 38 and returns the first three bytes from it to the client per box 356 of flowchart 350 and the prior explanation.

EXAMPLE #5

1. DBS=5 and BLT contains entry (29,4) and stored BT #1 contains entries (10,2) and (17,2).
2. Current BT contains entry (34,3).
3. Read request=(35,3). This is similar to Example #4 above except now there is a 3-byte block rather than a block of size DBS at physical offset 38 (virtual offset 34). Since read request is for virtual offsets/bytes 35-37, shim 105 reads and decrypts the 3-byte block and the block of DBS at physical offset 41 (virtual offset 37) according to box 356 of flowchart 350. It then returns to the client the last two bytes of the short 3-byte block and the first byte of the following block of size DBS.

EXAMPLE #6

1. DBS=5, BLT contains entries (29,4) and (42,4) and BT #1 is stored at physical offset 29 and contains entries (10,2) and (17,2). There is also a BT #2 stored at physical offset 42 containing entry (34,3).
2. Current BT contains nothing.
3. Read request=(35,3). Since BT #2 is stored after the virtual offset of the read request, it could contain entries that affect the read. Thus, shim 105 reads and decrypts BT #2. It then performs a lookup in BT #2 and determines there is an alternate short block of 3 bytes at physical offset 34. It thus does not need to read current BT, which is empty, and proceeds to preforming the read operations as in Example #5 above.

After having understood the details of the functionality of shim 105 for a Get operation of the present embodiments by the above examples, let us return to flowchart 350 of FIG. 14. As with earlier embodiments, if cloud storage 105 determines the credentials of the read operation to be invalid or not having sufficient privileges an error is returned and the operation is aborted per error box 362.

Put Operation:

To understand in detail the Put operation of the present embodiments, let us first revisit flowchart 400 of FIG. 5 explained earlier. Recall that flowchart 400 illustrates the steps required to carry out a write or a Put operation for a plaintext file $F_p$ of fixed block sizes $M_i$ as a secure, encrypted file $F_c$ in our cloud storage encryption system presented initially in FIG. 1. For Putting or writing blocks $M_i$ of variable sizes of FIG. 12, steps 402 through 424 of flowchart 400 per earlier explanation stay unchanged, except that now file-metadata of file $F_c$ contains the additional fields of DBS, BT and BLT.

In order to determine the default block size (DBS) of a file, shim 105 reads existing file-metadata of file $F_c$ being written. If $F_c$ is an existing file, the other fields of file-metadata namely version, FK Rotation Date, WK Rotation Date, $IV_{FK}$, DBS, BT, BLT, will already be present in file-metadata stored in file $F_c$, and which shim 105 first reads from cloud-storage 106. Otherwise, if $F_c$ is a new file, shim 105 generates those file-metadata fields to their default values. In an exemplary implementation the default values for these fields are as follows:

version: the version number of the implementation known to shim 105
FK Rotation Date: 90 days
WK Rotation Date: 30 days
$IV_{FK}$: randomly generated
DBS: 5 Megabytes
BT: fixed size, or variable size with TLV encoding
BLT: fixed size, or variable size with TLV encoding At this point, let us take advantage of extension flowchart 450 provided in FIG. 15 that shows the steps after step 424 of flowchart 400 of FIG. 5 in order to support the present embodiments. Instead of sequentially encrypting plaintext blocks $M_i$ of file $F_p$ at box 428 of FIG. 5, shim 105 now writes the requested number of blocks of specified length in file $F_c$. Given that some cloud storage services, such as AWS S3 only allow appending to a file in the cloud, our shim 105 simply has to append present block $F_c$ of the specified length at the end of file $F_c$ and update BT and BLT accordingly. This is shown by box 452 in flowchart 450 of FIG. 15.

In order to understand the Put operation in detail, let us revisit the examples provided above under Get/read operation of the present embodiments and see how the above exemplary bytes and blocks would have been Put or written. It should again be noted that besides shim 105, the below additional logic of updating BT and BLT may also be implemented in code running alongside the shim in the client or at tomcat server 510 of FIG. 6 as required for a given implementation.

EXAMPLES #1

1. DBS=5 bytes and at physical offset 10, there is a 2-byte block.
2. BT contains one entry, physical offset=10, length=2, or (physical offset, length)=(10,2).
3. The Put/write operation that resulted in the above is the writing of two blocks of length DBS by shim 105, and an alternate/short 2-byte block. The above Put operation of box 452 of FIG. 15 could have consisted of a single write request of the three blocks above. In this case, shim 105 would have decomposed the request into two write operations of DBS sized blocks, followed by a write operation of a 2-byte block.

Alternatively, as in a multipart upload, there could have been a write request of one DBS sized block, followed by a write request of another DBS sized block, followed by a write request of an alternate 2-byte block. Still alternatively, the above could have been the result of a write request of two DBS sized blocks, followed by a write request for the 2-byte block. In any event, at the time of the writing of the alternate 2-byte block, shim 105 would also have written the above entry of (10,2) in BT.

EXAMPLES #2

1. DBS=5 and BT contains entries (physical offset, length)=(10,2) and (17,2).
2. The Put/write operation(s) that resulted in the above would have been Put Example #1 above, followed by writing by shim 105 of a block of length/size DBS. This block would have been written/appended in file $F_c$ at a physical offset of 12. The above would have been followed by the writing of a 2-byte block at physical offset 17, and two more DBS sized blocks at physical offsets 19 and 24. As before, the above could have been done as a single operation. Alternatively, as in the case of a multipart upload, they could have been done as a series of Put/write operations (or appends in case of AWS S3).

EXAMPLE #3

1. DBS=5 and BLT contains an entry, physical offset=29, length=4, or 4 bytes of BT #1 stored at physical offset=29, or (29,4). BT #1 stored at physical offset 29 in cloud storage 105 contains entries (10,2) and (17,2).
2. Current BT contains nothing.
3. The Put/write operation(s) that resulted in the above would have been Put Example #2 of the present embodiments above followed by shim 105 flushing out the BT or appending BT to file Fc at physical offset 29 (after the data of Example #2 above). As part of Put/write or append operation shim, 105 would have added the BLT and written entry (29,4) in it.

EXAMPLE #4

1. DBS=5 and BLT contain entry (29,4).
2. Current BT contains nothing.
3. The write/Put operation(s) that resulted in the above would have been Put Example #3 above followed by 2 DBS sized blocks at physical offsets 33 and 38. As in the other examples, this could have been a single Put/write request by the client to shim 105. Alternatively, it could have been the result of shim 105 being sent a multipart upload request with some default size blocks and some 2-byte blocks.

EXAMPLE #5

1. DBS=5 and BLT contains entry (29,4) and BT #1 is stored at physical offset 29 and contains entries (10,2) and (17,2).
2. Current BT contains entry (34,3).
3. The Put/write operation(s) that resulted in the above would have been Put Example #4 above up to physical offset 38. After that a 3-byte block was written/appended. As a part of that Put/write operation the BT would have been updated to include the alternate 3-byte block.

EXAMPLE #6

1. DBS=5, BLT contains entries (29,4) and (42,4) and BT #1 is stored at physical offset 29 and contains entries (10,2) and (17,2). There is also a BT #2 stored at physical offset 42 containing entry (34,3).
2. Current BT contains nothing.
3. The Put/write operation(s) that resulted in the above would have been Put Example #5 above followed by the writing of a DBS sized block starting at physical offset 46 and virtual offset 42.

While writing a block $*C_i$ in secured file Fc at box 452 of FIG. 15, shim 105 performs authenticated encryption of Eq. 1A to encrypt plaintext block $M_i$ of file $F_p$, by using inputs FK, $IV_i$, $M_i$ and Sha-2 (Ver, block ID, $IV_i$) to obtain corresponding variable sized ciphertext block $C_i$ of the present embodiments and tag $T_i$. It then writes data blocks $*C_i$ with block-metadata$_i$ of secured file $F_c$ to cloud storage 106 of FIG. 1 for the client. Furthermore, while Put/writing the last block $*C_i$ of a write operation/request, shim 105 would also have generated HMAC for file-metadata with the latest values for BT and BLT and written file-metadata to file $F_c$.

It is worth noting that some cloud storage services, such as AWS S3, only allow updating file-metadata when file $F_c$ is being written to. As such, for those implementations, the updating of file-metadata ought to be done concurrently while Put/writing the last data block $*F_c$ for a given Put/write operation.

Copy Operation:

As in prior embodiments, a copy operation is implemented as a combination of a Get/read operation and a Put/write operation explained above, in order to support variable sized blocks of the present embodiments.

Delete Operation:

Again, as in prior embodiments, a delete operation is passed through to cloud storage 106 of FIG. 1.

The present embodiments also support Getting/reading an entire file from the cloud storage by specifying the entire size of the file in a read request, or a subset of a file by specifying the required bytes and offset. This was shown amply by the above examples. Similarly, the present embodiments also support Putting/writing an entire file or a subset of a file. As already noted earlier, the write request may be single request, or a series of requests of variable sized blocks. By employing two levels of indirection (BT and BLT), the present embodiments can support files of arbitrarily large block sizes not equal to DBS to be stored in a secured, encrypted manner in the cloud storage.

All other relevant teachings and extensions of the prior embodiments using fixed sized blocks also apply to the present embodiments employing variable sized blocks per above explanation.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A computer-implemented method for securing a plaintext file $F_p$ as an encrypted, ciphertext file $F_c$ in a cloud storage, said method comprising the steps of:
   (a) providing a user $U_1$ using a client device, a network-based access to said cloud storage;
   (b) assigning to said plaintext file $F_p$, a symmetric file-key FK;
   (c) using a first authenticated encryption to encrypt each variable sized block $M_i$ of said plaintext file $F_p$ with said file-key FK by utilizing a corresponding initialization vector $IV_i$ to obtain a corresponding variable sized encrypted block $C_i$ and a corresponding authentication tag $T_i$;
   (d) storing in said cloud storage, a corresponding data block $*C_i$ of said encrypted, ciphertext file $F_c$, said data block $*C_i$ comprising a sequence number of said corresponding block $M_i$, said corresponding initialization vector $IV_i$, said corresponding variable sized encrypted block $C_i$ and said corresponding authentication tag $T_i$;
   (e) using a second authenticated encryption to encrypt said file-key FK by a symmetric wrapping-key WK by utilizing an initialization vector $IV_{FK}$ to obtain a wrapped-file-key WFK and an authentication tag $T_{FK}$;
   (f) storing said wrapping-key WK in a key manager in accordance with a security policy; and
   (g) storing a block table BT and a default block size DBS in a metadata of said encrypted, ciphertext file $F_c$.

2. The method of claim 1, recording said variable sized encrypted block $C_i$ in said block table BT, if said variable sized encrypted block $C_i$ is not of the same size as said default block size DBS.

3. The method of claim 1, implementing said security policy by utilizing a policy engine and administrative tools.

4. The method of claim 3, routing said network-based access via a proxy server residing in the same network as said policy engine.

5. The method of claim 1, storing said initialization vector $IV_{FK}$, said authentication tag $T_{FK}$ and a block lookaside table (BLT) in said metadata of said encrypted, ciphertext file $F_c$.

6. The method of claim 5 when said metadata becomes full, storing said block table BT to said encrypted, ciphertext file $F_c$ and recording its location in said block lookaside table BLT.

7. The method of claim 1, using Advanced Encryption Standard (AES) in Galois/Counter Mode (GCM) for said first authenticated encryption and said second authenticated encryption.

8. The method of claim 1, performing said step (c) in a shim layer configured above an application programming interface (API) of said cloud storage, said shim layer intercepting and servicing storage requests generated on said client device.

9. The method of claim 8, providing said storage requests to comprise one or more of a Get, a Put and a Copy operation.

10. The method of claim 8, configuring said shim layer to perform authenticated decryption of said variable sized encrypted block $C_i$ to obtain corresponding said block $M_i$ of said plaintext file $F_p$.

11. The method of claim 1, providing a representational state transfer (REST) server to perform said step (c).

12. The method of claim 1, cryptographically protecting said metadata from modification by computing a hash message authentication code (HMAC).

13. The method of claim 1, configuring said key manager to also reside in the same cloud where said cloud storage resides.

14. The method of claim 1, encrypting said wrapping-key WK by a master key stored in a physical and hardened hardware security module (HSM).

15. A cloud storage encryption system comprising at least one memory device storing computer-readable instructions, at least one microprocessor coupled to said at least one memory device for executing said computer-readable instructions, said system further comprising a client device with network-based access to a cloud storage and said at least one microprocessor configured to:
   (a) assign a symmetric file-key FK to a plaintext file $F_p$;
   (b) use a first authenticated encryption to encrypt each variable sized block $M_i$ of said plaintext file $F_p$ with said file-key FK by utilizing a corresponding initialization vector $IV_i$ to obtain a corresponding variable sized encrypted block $C_i$ and a corresponding authentication tag $T_i$;
   (c) store in said cloud storage a corresponding data block $*C_i$ of an encrypted, ciphertext file $F_c$, said data block $*C_i$ comprising a sequence number of said corresponding block $M_i$, said corresponding initialization vector $IV_i$, said corresponding variable sized encrypted block $C_i$ and said corresponding authentication tag $T_i$;
   (d) in accordance with a security policy, use a second authenticated encryption to encrypt said file-key FK by a symmetric wrapping-key WK by utilizing an initialization vector $IV_{FK}$ to obtain a wrapped-file-key WFK and an authentication tag $T_{FK}$, and store said wrapping-key WK in a key manager; and
   (e) store a block table BT and a default block size DBS in a metadata of said encrypted, ciphertext file $F_c$.

16. The cloud storage encryption system of claim 15 wherein said cloud storage is hosted at one of an Amazon Web Services (AWS) data centers, Google Cloud data centers and Microsoft Azure data centers.

17. The cloud storage encryption system of claim 15 wherein a location of said variable sized encrypted block $C_i$ in said encrypted, ciphertext file $F_c$ is recorded in said block table BT, if said variable sized encrypted block $C_i$ is not of the same size as said default block size DBS.

18. The system of claim 17 wherein if said metadata becomes full, said block table BT is stored in said encrypted, ciphertext file $F_c$ and its location is recorded in a block lookaside table BLT contained in said metadata.

19. The cloud storage encryption system of claim 15, wherein a policy engine and administrative tools are utilized to enforce said security policy.

20. The cloud storage encryption system of claim 15, wherein said network-based access of said client device to said cloud storage is routed via a representational state transfer (REST) proxy server.

21. The cloud storage encryption system of claim 15, wherein said first authenticated encryption and said second authenticated encryption are performed using Advanced Encryption Standard (AES) in Galois/Counter Mode (GCM).

22. The cloud storage encryption system of claim 15 wherein said cloud storage is hosted at the data centers of multiple cloud storage vendors.

23. The cloud storage encryption system of claim 15, wherein said first authenticated encryption is performed in a shim layer provided above an application programming interface (API) of said cloud storage, and wherein said shim layer intercepts and services storage requests from said client device, and wherein said storage requests comprise one or more of a Get, a Put and a Copy operation.

24. The cloud storage encryption system of claim 23, wherein said metadata is cryptographically protecting by a hash message authentication code (HMAC).

25. The cloud storage encryption system of claim 24, wherein a physical hardware security module (HSM) is used for storing a master key that is used for encrypting said wrapping-key WK.

* * * * *